(12) United States Patent
Merjanian et al.

(10) Patent No.: US 10,893,317 B2
(45) Date of Patent: *Jan. 12, 2021

(54) COMMUNICATION EXCHANGE SYSTEM FOR REMOTELY COMMUNICATING INSTRUCTIONS

(71) Applicant: TITAN HEALTH & SECURITY TECHNOLOGIES, INC., Newport Beach, CA (US)

(72) Inventors: Vic A. Merjanian, Newport Beach, CA (US); Eduardo Juarez, Newport Beach, CA (US); Ryan Khalili, Newport Beach, CA (US); Daniel Wallengren, Newport Beach, CA (US); Serene Nasser, Newport Beach, CA (US); Ed Merjanian, Newport Beach, CA (US)

(73) Assignee: TITAN HEALTH & SECURITY TECHNOLOGIES, INC., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,492

(22) Filed: Dec. 13, 2019

(65) Prior Publication Data

US 2020/0120377 A1 Apr. 16, 2020

Related U.S. Application Data

(63) Continuation of application No. 15/993,976, filed on May 31, 2018, now Pat. No. 10,511,881.

(51) Int. Cl.
*H04N 21/43* (2011.01)
*G06F 16/29* (2019.01)
(Continued)

(52) U.S. Cl.
CPC .......... *H04N 21/431* (2013.01); *G06F 16/29* (2019.01); *G06F 16/434* (2019.01); *G06F 16/4393* (2019.01); *G06F 16/44* (2019.01)

(58) Field of Classification Search
CPC ............ H04N 21/431; G06F 17/30056; G06F 17/30058; G06F 17/30047; G06F 17/30241

See application file for complete search history.

(56) References Cited

U.S. PATENT DOCUMENTS 8,700,005 B1 * 4/2014 Kiraly .................... G06Q 30/00
455/412.2
9,298,884 B1 * 3/2016 Ahmad ............... G06F 19/3418
(Continued)

FOREIGN PATENT DOCUMENTS

WO WO 2017/072616 5/2017

OTHER PUBLICATIONS

Lang et al., International publication No. WO 2017/160651 filed Mar. 10, 2017 (Year: 2017).*

(Continued)

*Primary Examiner* — Tapas Mazumder
(74) *Attorney, Agent, or Firm* — Sheppard, Mullin, Richter & Hampton LLP

(57) ABSTRACT

A server may communicatively couple to a user device and an instructor device. The server may receive location information from the user device. The location information may define visual content captured by the user device. The server may transmit the location information to the instructor device. The instructor device may present the visual content based on the received location information and receive input defining an instruction from an instructor. The server may receive instruction information defining the instruction from the instructor device. The server may transmit the instruction (Continued)

information to the user device. The user device may present the instruction overlaid on top of the visual content based on the received instruction information.

20 Claims, 13 Drawing Sheets

(51) Int. Cl.
*H04N 21/431* (2011.01)
*G06F 16/44* (2019.01)
*G06F 16/432* (2019.01)
*G06F 16/438* (2019.01)

(56) References Cited

U.S. PATENT DOCUMENTS

| | | | | |
|---|---|---|---|---|
| 2008/0320419 | A1* | 12/2008 | Matas | G01C 21/20 715/863 |
| 2009/0164914 | A1* | 6/2009 | Chen | G06Q 10/107 715/753 |
| 2010/0118350 | A1* | 5/2010 | Allwright | H04N 1/00209 358/402 |
| 2014/0025206 | A1* | 1/2014 | Matsui | G05D 11/13 700/265 |
| 2015/0325148 | A1 | 11/2015 | Kim | |
| 2017/0199976 | A1 | 7/2017 | Rizvi | |
| 2017/0308722 | A1* | 10/2017 | Oikawa | G06F 12/00 |
| 2017/0323062 | A1 | 11/2017 | Djajadiningrat | |
| 2017/0325091 | A1 | 11/2017 | Freeman | |

OTHER PUBLICATIONS

New Emergency Medicine Paradigm via Augmented Telemedicine; Virtual, Augmented and Mixed Reality: 8th International Conference, VAMR 2016, Held as Part of HCI International 2016, Toronto, Canada, Jul. 17-22, 2016. Proceedings (pp. 502-511).

Wang, Augmented Reality as a Telemedicine Platform for Remote Procedural Training, Sensors 2017, www.mdpi.com/journal/sensors, 21 pages.

De Leo, Gialuca; A Virtual Reality System for the Training of Volunteers Involved in Health Emergency Situations Cyber Physcology & Behavior, vol. 6, No. 3, 2003, 10 pages.

\* cited by examiner

COMMUNICATION EXCHANGE SYSTEM FOR REMOTELY COMMUNICATING INSTRUCTIONS

REFERENCE TO RELATED APPLICATION

The present application is a continuation of and claims priority to U.S. patent application Ser. No. 15/993,976, filed May 31, 2018 and titled "COMMUNICATION EXCHANGE SYSTEM FOR REMOTELY COMMUNICATING INSTRUCTIONS," which is incorporated herein by reference in its entirety.

TECHNICAL FIELD

The disclosed technology relates generally to communication exchange systems, and in particular to technology for remotely communicating instructions.

BACKGROUND

In some instances, it may be necessary to communicate instructions to a remote person to enable the person to carry out some task. For instance, a medical emergency scenario at a location may require a non-medical person at the location to perform a medical procedure or to use unfamiliar medical equipment. A person trained on the medical procedure or the medical equipment may not be at the location and may need to communicate instructions relating to the medical procedure or the medical equipment to the person at the location.

BRIEF SUMMARY OF EMBODIMENTS

One aspect of the present disclosure is directed to a system for remotely communicating instructions. The system may comprise a server that communicatively couples to a first user device and an instructor device. The server, the first user device, and the instructor device may individually comprise a memory and a processor. The server may be configured to: receive location information from the first user device, the location information characterizing a location of the first user device, wherein the location information defines visual content captured by the first user device; transmit at least a portion of the location information to the instructor device, the instructor device configured to present the visual content within an instructor interface based on the received location information and receive input from an instructor through the instructor interface, the input defining an instruction associated with the visual content; receive instruction information defining the instruction associated with the visual content from the instructor device; and transmit at least a portion of the instruction information to the first user device, the first user device configured to present the instruction overlaid on top of the visual content within a first learner interface based on the received instruction information.

Another aspect of the present disclosure is directed to a method for remotely communicating instructions. The method may be performed by a server communicatively coupled to a first user device and an instructor device. The server, the first user device, and the instructor device may individually comprising a memory and a processor. The method may comprise: receiving location information from the first user device, the location information characterizing a location of the first user device, wherein the location information defines visual content captured by the first user device; transmitting at least a portion of the location information to the instructor device, the instructor device configured to present the visual content within an instructor interface based on the received location information and receive input from an instructor through the instructor interface, the input defining an instruction associated with the visual content; receiving instruction information defining the instruction associated with the visual content from the instructor device; and transmitting at least a portion of the instruction information to the first user device, the first user device configured to present the instruction overlaid on top of the visual content within a first learner interface based on the received instruction information.

Another aspect of the present disclosure is directed to a non-transitory computer readable medium comprising instructions that, when executed, may cause a server communicatively coupled to a first user device and an instructor device to perform: receiving location information from the first user device, the location information characterizing a location of the first user device, wherein the location information defines visual content captured by the first user device; transmitting at least a portion of the location information to the instructor device, the instructor device configured to present the visual content within an instructor interface based on the received location information and receive input from an instructor through the instructor interface, the input defining an instruction associated with the visual content; receiving instruction information defining the instruction associated with the visual content from the instructor device; and transmitting at least a portion of the instruction information to the first user device, the first user device configured to present the instruction overlaid on top of the visual content within a first learner interface based on the received instruction information.

In some embodiments, the visual content may include one or more images or one or more videos of the location.

In some embodiments, the first learner interface may include a record option to record one or more portions of the instruction being presented on top of the visual content. The first learner interface may include a bookmark option to bookmark one or more portions of the instruction being presented on top of the visual content.

In some embodiments, the instructor interface may include a segmentation option to segment the presentation of the instruction by the first user device into multiple parts. Presentation of different parts of the instruction by the first user device may be controlled through the first learner interface or the instructor interface.

In some embodiments, the first learner interface may include a change option to change the instruction. The server may be further configured to facilitate exchange of the change to the instruction between the first user device and the instructor device.

In some embodiments, the presentation of the instruction by the first user device may include a visual representation of a usage of an item with respect to a target at the location. The visual representation of the usage of the item with respect to the target at the location may be scaled based on a size of the target.

In some embodiments, the instructor interface may include an item option to allow the instructor to interact with a visual representation of the item to define the instruction on the usage of the item with respect to the target at the location. The visual representation of the item is presented in the instructor interface based on a determination that the item is available for use at the location. The item option may include a set of preset options defining preset usage of the item with respect to the target at the location. At least some of the set of preset options may be included within the instructor interface based on the location information further defining one or more characteristics of the target at the location.

In some embodiments, the item option may allow the instructor to define the usage of the item with respect to the target at the location based on a three-dimensional model of the target. The visual representation of the usage of the item with respect to the target at the location may be presented based on a three-dimensional model of the target. A three-dimensional model of the target may be generated based on a three-dimensional mapping of the target by the first user device, and the location information may further defines the three-dimensional mapping of the target.

In some embodiments, the server may further communicatively couple to a second user device. The server may be further configured to transmit companion instruction information to the second user device. The companion instruction information may define the instruction. The second user device may be configured to present the visual representation of the usage of the item with respect to the target at the location within a second learner interface based on the received companion instruction information.

In some embodiments, the presentation the visual representation of the usage of the item with respect to the target at the location by the first user device and the second user device may include different perspectives of the usage of the item with respect to the target at the location based on orientations of the first user device and the second user device with respect to the target at the location.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
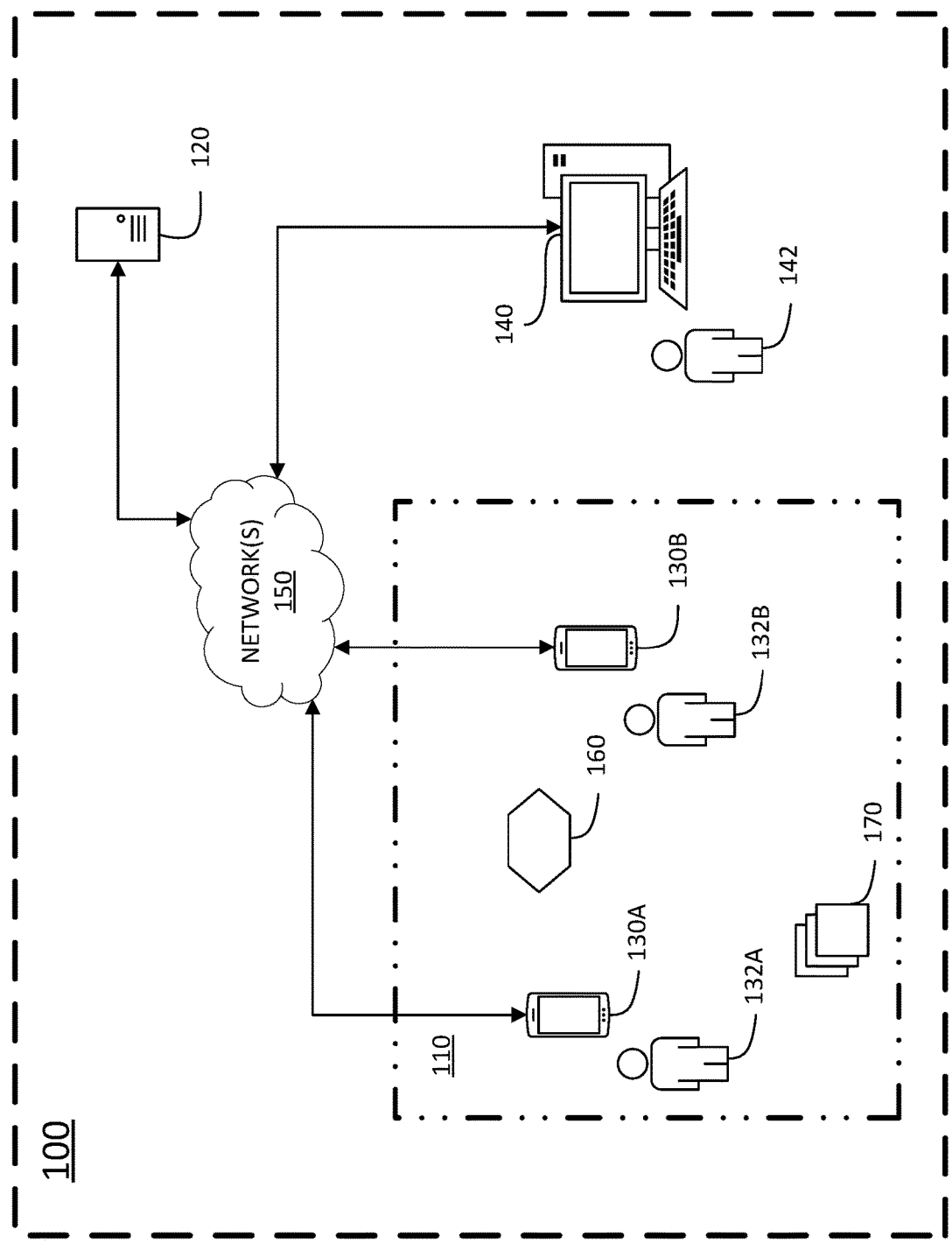
FIG. 1 illustrates an example environment in which one or more embodiments in accordance with the technology of the present disclosure may be implemented.

FIG. 1 shows an example environment 100 in which one or more embodiments of the technology disclosed herein may be implemented. The environment 100 may include multiple computing devices (e.g., a server 120, a user device 130A, a user device 130B, an instructor device 140), one or more users (e.g., a user 132A, a user 132B), one or more instructors (e.g., an instructor 142), one or more targets (e.g., a target 160), one or more items (e.g., items 170), and/or other components. The server 120 may communicatively couple to one or more other computing devices, such as the user device 130A, the user device 130B, and/or the instructor device 140, through one or more networks 150. The server 120 may receive location information from at least one of the user devices 130A, 130B. For example, the server may receive location information from the user device 130A. The location information may characterize a location 110 of the user device 130A. The location 110 may also include one or more of the user device 130B, the user 132A, the user 132B, the target 160, and/or the items 170. The location information may define visual content (e.g., image(s), video(s)) captured by the user device 130A. The server 120 may, responsive to receiving the location information from the user device 130A, transmit at least a portion of the location information to the instructor device 140. The instructor device 140 may present the visual content within an instructor interface (e.g., presented on a display of the instructor device 140) based on the received location information. The instructor device 140 may receive input from the instructor 142 through the instructor interface. The input from the instructor 142 may define one or more instructions associated with the visual content. The server may 120 receive instruction information from the instructor device 140. The instruction information may define the instruction(s) associated with the visual content. The server 120 may, responsive to receiving the instruction information from the instructor device 140, transmit at least a portion of the instruction information to the user device 130A. The user device 130A may present the instruction(s) overlaid on top of the visual content within a user interface (e.g., presented on a display of the user device 130A) based on the received instruction information.

Having thus described an example environment in which the disclosed technology can be implemented, various features and embodiments of the disclosed technology are now described in further detail. After reading the description herein, it will become apparent to one of ordinary skill in the art that the disclosed technology can be implemented in any of a number of different environments.

A computing device within the environment 100 may refer to a machine for performing one or more calculations, such as a computer, a data processor, an information processing system, and/or other computing device. A computing device may include a mobile device, such as a laptop, a tablet, a smartphone, a smartwatch, smart glasses, a smart wear, a PDA, and/or other mobile device. A computing device may include a non-mobile device, such as a desktop computer and/or other non-mobile device. A computing device may include one or more processors, memory, and/or other components. The processor(s) may include one or more physical processors and/or one or more virtual processors. The processor(s) may be configured by software, firmware, and/or hardware to perform one or more functions described herein. Memory may include permanent memory and/or non-permanent memory. Memory may store one or more instructions, which may be executed by the processor(s). The execution of the instruction(s) by the processor(s) may cause the computing device to perform one or more functionalities described herein. A computing device may include and/or be coupled with other components, such as interface components, to perform its functions.

The server 120, the user devices 130A, 130B, the instructor device 140 may communicate through the network(s) 150. The type of communication facilitated by through the network(s) 150 may vary, for example, based on the communication protocol available to the server 120, the user devices 130A, 130B, and/or the instructor device 140. Some non-limiting examples of communication protocols over which the computing devices may communicate through the network(s) 150 may include: cellular telecommunications protocols, such as GSM, UMTS, CDMA2000, LTE, or WiMAX; wired communication methods, such as cable, DSL, dial-up, or fiber-optic; and/or wireless communication methods, such as satellite communications, Wi-Fi, Bluetooth, or near-field communication (NFC). Usage of other communication protocols are contemplated.

The environment 100 may also include one or more datastores and/or one or more databases that are accessible to one or more computing devices. The database(s) and/or datastore(s) may be stored within one or more memories of the computing devices, stored in one or more memories of devices coupled to a computing device, and/or may be accessible via one or more networks, such as the network(s) 150.

While various computing devices (e.g., the server 120, the user device 130A, the user device 130B, the instructor device 140) are shown in FIG. 1 as single entities, this is merely for ease of reference and is not meant to be limiting. One or more components/functionalities of a computing device described herein may be implemented, in whole or in part, within a single computing device or within multiple computing devices. For example, the server 120 may refer to a single server, multiple servers that are physically co-located, and/or multiple servers that are located in different physical locations.

The distribution of computing devices/functionalities shown in FIG. 1 is merely an example and is not meant to be limiting. For example, components/functionalities of multiple computing devices may be implemented within a single computing device. For instance, rather than the instructor device 140 being separate and apart from the server 120, the instructor device 140 may be part of the server 120 and/or located with/near the server 120. Other distribution of computing devices/functionalities are contemplated.

While the disclosure is described herein with respect to providing instructions relating to medical procedures and operation of machines, this is merely for illustrative purposes and is not meant to be limiting. The approach disclosed herein may be used to provide other types of instructions to users.

The environment 100 may include the location 110. The location 110 may refer to a particular place or position. The location 110 may include the users 132A, 132B, the user devices 130A, 130B, the target 160, and/or the items 170. The location 110 may not include the server 120, the instructor 142, and/or the instructor device 140.

The users 132A, 132B may refer to persons at the location 110. One or more of the users 132A, 132B may require instructions from a person not at the location 110, such as the instructor 142. The user(s) 132A, 132B may require instructions relating to the target 160.

The user devices 130A, 130B may refer to computing devices associated with (e.g., used by, owned by, registered to) the users 132A, 132B. The user devices 130A, 130B may include mobile devices and/or non-mobile devices. The user devices 130A, 130B may include one or more displays (e.g., touchscreen-display, non-touchscreen display), one or more speakers, one or more microphones, and/or one or more interface devices (e.g., physical/virtual keyboard and/or mouse).

One or more of the user devices 130A, 130B may generate location information for the location 110. Location information may refer to information that describes a location. That is, the location information may characterize the location 110. The location information may characterize physical and/or non-physical aspects of the location 110. For example, the location information may define geographical aspects of the location 110, such as the longitude, latitude, and/or elevation of the location 110, the address of the location 110, and/or the surrounding of the location.

The location information may define one or more visual content (e.g., images, videos) captured by one of the user devices 130A, 130B. For example, the user device 130A may include one or more cameras, including lens(es) and image sensor(s), and the user 132A may use the user device 130A to capture image(s) and/or video(s) of the location 110 as part of the location information. The image(s) and/or the video(s) of the location 110 may include visual representations of objects within the location 110, such as the target 160 and/or the items 170. The image(s) and/or the video(s) of the location 110 may be analyzed to determine additional information about the location 110. For instance, visual analysis of the image(s) and/or the video(s) may be performed to identify the items 170 present at the location, to determine characteristics of the items 170, to identify the target 160, and/or to determine characteristics of the target 170. The image(s) and/or the video(s) may be analyzed to determine a three-dimensional mapping and/or a three-dimensional model of an object at the location 110. For example, the user device 130A may include multiple cameras and may be used to capture visual representations of the target 160 from multiple perspectives. The visual representations of the target 160 from multiple perspectives may be used, along with intrinsic and/or extrinsic camera parameters, to determine a three-dimensional mapping of the target 160. The three dimensional mapping of the target 160 may include a depth map that contain information relating to the distance of the surfaces of the target from a viewpoint (e.g., the user device 130A). The three-dimensional mapping of the target 160 may be used to generate a three-dimensional model of the target 160. Other analysis of the image(s) and/or the video(s) captured by the user device 130A are contemplated. Analysis of the image(s) and/or video(s) may be performed by the user device 130A, the server 120, the instructor device 140, and/or other computing devices.

The location information may define one or more objects at the location 110. Objects at the location 110 may refer to living and/or non-living things that are at the location 110. For example, the location information may identify the target 160 and/or the items 170. The location information may describe one or more characteristics of the target 160 and/or the items 170. The location information may define an object at the location 110 based on user input and/or other information. For example, the user device 130A may generate location information that identifies and/or describes the characteristics of the target 160 based on the user 132A entering information relating to the target 160 into the device 130A. As another example, the user device 130A may generate location information that identifies and/or describes the characteristics of one or more of the items 170 based on visual analysis of the image(s)/video(s) captured by the user device 130A. Visual analysis of the image(s)/video(s) may include visual analysis that detects features and/or shapes of the objects and matches the detected features/shapes with particular objects, visual analysis that identifies tags, such as QR codes, associated with particular objects, and/or other visual analysis. Such location information may be used to determine that particular objects are at the location 110. For instance, such location information may be used to determine that particular items (e.g., the items 170) are available for use at the location 110. As further example, the location information may define one or more characteristics of the user 132A and/or the user 132B. For instance, the location information may identify the user 132A and/or other information relating to the user 132A that may be relevant to efforts to the directed to the target 160. For example, the education and/or vocation training of the user 132A may be relevant for the instructor 142 in determining the depth of instruction to be provided to the user 132A, and such information may be generated by the user device 130A.

One or more of the user devices 130A, 130B may transmit the location information to the server 120 (e.g., via the network(s) 150). For example, the user device 130A may capture image(s) and/or video(s) of the location 110 and may convey information defining the image(s) and/or the video(s) to the server 120. The user device 130A may generate location information that describes the location and/or object(s) within the location and may provide the location information to the server 120. The location information may be transmitted by the user devices 130A, 130B to the server 120 automatically and/or based on user input. For instance, the user 132A may start an application on the user device 130A to receive instruction from the instructor 142. The application may enable the user 132A to use the user device 130A to generate location information for the location 110, such as by capturing image(s)/video(s) and/or by manually entering information into the user device 130A. The application may send the location information to the server 120 as the location information is generated by the user device 130A and/or based on the user 132A indicating to the application to send the location information to the server 120.

The target 160 may refer to one or more living and/or non-living things for which efforts are directed. The target 160 may refer to a thing for which one or both of the users 132A, 132B may require instructions. For example, the target 160 may refer to a person who requires a medical procedure and for whom the user 132A requires medical instructions from the instructor 142. As another example, the target may refer to a machine that needs to be operated and for which the user 132A require operating instructions from the instructor 142. Other types of targets are contemplated.

The server 120 may refer to a computing device that facilitates exchange of information between one or more of the user devices 130A, 130B and the instructor device 140. The server 120 may include a mobile device and/or a non-mobile device. For instance, the server 120 may receive information from the user device 130A and, responsive to the reception of the information, relay the received information to the instructor device 140, and vice versa. For example, the server 120 may receive location information from the user device 130A, and relay the location information to the instructor device 140. The relay of information performed by the server 120 may include reception of information from the user device 130A and transmission of a copy of the received information to the instructor device 140. That is, the server 120 may relay an exact copy of the information received from the user device 130A to the instructor device 140. For example, the server 120 may receive an image or a video of the location 110 from the user device 130A and may transmit the image or the video to the instructor device 140.

The relay of information performed by the server 120 may include reception of information from the user device 130A and transmission of a modified version of the received information to the instructor device 140. For example, the server 120 may transmit one or more portions of the received information to the instructor device 140 or may alter one or more portions of the received information before transmission to the instructor device 140. For instance, the server 120 may receive an image or a video of the location 110 from the user device 130A and may transmit a lower fidelity version of the image or the video (e.g., having lower resolution, having lower color depth, having lower framerate) to the instructor device 140. Such modification of the location information may provide for resource savings, such as lower bandwidth, lower processing cost, lower memory usage, and/or other reduction of computing resources in facilitating exchange of information between the user device 130A and the instructor device 140.

As further example, the server 120 may determine other information based on the received information and transmit the other information to the instructor device 140. For instance, based on the location information identifying the coordinate position and/or the address of the location 110, the server 120 may access one or more databases that include information on different items available for use at different locations. The server 120 may access such database(s) to determine a list of items available for use by the user 132A at the location 110, such as a list including the items 170. The server 120 may provide such list of items and/or information relating to items available for use at the location 110 to the instructor device 140. Or, based on the location information including images/videos of the items 170 or the target 160, the server 120 may use visual analysis to identify the items 170 or the target 160 and/or to determine characteristics of the items 170 or the target 160. Based on the location information including images with visual representations of the target 160 from multiple perspectives, the server 120 may determine a three-dimensional mapping of the target 160 and/or generate a three-dimensional model of the target 160. The server 120 may provide the three-dimensional mapping/model of the target 160 to the instructor device 140. Provision of the three-dimensional mapping/model of the target 160 to the instructor device 140 may enable the instructor 142 to provide three-dimensional instruction for the target 160 and/or instruction for the target 160 that takes into account the shape and/or size of the target 160.

The instructor device 140 may refer to a computing device associated with (e.g., used by, owned by, registered to) the instructor 142. The instructor device 140 may include a mobile device and/or a non-mobile device. The instructor device 140 may include one or more displays (e.g., touchscreen-display, non-touchscreen display), one or more speakers, one or more microphones, and/or one or more interface devices (e.g., physical/virtual keyboard and/or mouse). The instructor 140 may refer to a person remote from the location 110. The instructor 140 may provide instructions to a person at the location 110, such as the user 132A or the user 132B. The instructor 142 may provide instructions relating to the target 160.

The instructor device 140 may receive at least a portion of the location information from the server 120. The location information received by the instructor device 140 from the server 120 may include a copy of the location information received by the server 120 (e.g., from the user device 130A), a modified version of the location information received by the server 120, and/or other information determined by the server 120 based on the location information received by the server 120. The instructor device 140 may, responsive to receiving information from the server 120, provide a visual and/or verbal representation of the information to the instructor 142. For example, the instructor device 140 may receive as/as part of location information visual content (e.g., image, video) of the location 110 from the server 120, and the instructor device 140 may present the visual content on a display of the instructor device 140. The visual content may be presented within one or more user interfaces based on the location information received from the server 120. A user interface provided by the instructor device 140 may be referred to as an instructor interface. A user interface provided by the user devices 130A, 130B may be referred to as a learner interface. The instructor device 140 may receive input from the instructor 142 through the instructor interface.

For example, based on the location information received from the server 120, the instructor device 140 may present an image or a video of the location 110 within an instructor interface. The image/video of the location 110 may include a visual representation of the target 160. Based on the presentation of the target on a display of the instructor device 140, the instructor 142 may provide input to the instructor device 140. For example, the instructor 142 may use one or more of a touchscreen display, a microphone, a physical/virtual keyboard and/or a mouse to provide input to the instructor device 140 through the instructor interface.

The input from the instructor 142 may define one or more instructions associated with the visual content. For example, the input from the instructor 142 may define a particular instruction to be provided to the user 132A via the user device 130A in conjunction with the image/video with which the instruction is associated. An instruction from the instructor 142 may include a direction and/or an order for the user 132A. An instruction from the instructor 142 may include information that details how the user 132A is to act with respect to the target 160. An act of the user 132A with respect to the target 160 may include the user 132A acting alone, the user 132A acting with other person(s) (e.g., the user 132B), and/or the user 132A using or not using one or more items (e.g., the items 170). The instruction from the instructor 142 may be overlaid on top of an image or a video (associated with the instruction) captured by the user device 130A. For example, the instruction from the instructor 142 may be overlaid on top of an image/video captured by the user device 130A in the form of stationary and/or moving image/graphic, text, message box, lines, and/or other visual form.

For example, the target 160 may include a person needing medical attention and an instruction from the instructor 142 may include information on how the user 132A is to perform a medical procedure on the target 160 and/or how the user 132A is to use one or more of the items 170 on the target 160. As another example, the target 160 may include a machine that requires to be operated and an instruction from the instructor 142 may include information on how the user is to operate the target 160 and/or how the user 132A is to use one or more of the items 170 on the target 160. The instruction from the instructor 142 may be associated with image(s) or video(s) captured by the user device 130A such that the instruction is overlaid on presentation of the image(s) or the video(s) by the user device 130A.

In some embodiments, the instructor interface may include one or more item options to allow the instructor 142 to interact with a visual representation of an item to define an instruction on the usage of the item with respect to the target 160 at the location 110. For example, the item option may include one or more options by which the instructor 142 may select an item to be used and/or one or more options by which the instructor 142 may specify how the item is to be used with respect to the target 160. For instance, the instructor interface may present visual representations of various items (e.g., names, model number, icons, images, etc.), such as within an item drawer, in the instructor interface for selection by the instructor 142.

In some embodiments, a visual representation of an item may be presented in the instructor interface based on a determination that the item is available for use at the location 110. For example, an item may be determined to be available for use at the location 110 based on visual analysis of an image/video captured by the user device 130A indicating the presence of the item at the location 110, such as among the items 170, based on the user 132A indicating that the item is available, and/or based on the item being associated with the coordinate position and/or the address of the location 110. Based on the determination that the item is available for use at the location 110, the instructor device 140 may present the visual representation of item within the instructor interface for selection by the instructor 142.

The instructor 142 may interact with the visual representation of the item to define the instruction for the user 132A. For example, the item may include a tool and the visual representation of the item may include an image of the tool. The instructor 142 may move the image of the tool within the instructor interface and with respect to the visual representation of the target 160 within the instructor interface to define how the item is to be used on the target 160 by the user 132A. In some embodiments, a visual representation of the usage of the item with respect to the target 160 at the location 110 may be scaled based on a size of the target 160. That is, as the instructor moves the visual representation of the target 160 within the instructor interface, the visual representation of the target may increase or decrease in size to provide an idea of scale of the item with respect to the target 160. For instance, the size of the visual representation of the item on the instructor interface may change based on whether the target 160 is a baby or an adult. The instructor interface may include options for the instructor 142 to manually change the scaling of the visual representation of the item with respect to the target 160.

In some embodiments, the item option(s) provided by the instructor interface may include one or more present options for selection by the instructor 142. A preset option may define a preset usage of an item with respect to the target 160 at the location 110. For example, a particular tool available at the location 110 may include a set of preset uses. The instructor interface may provide the preset uses of this tool so that the instructor 142 may be able to choose a preset usage for provision to the user 132A, rather than manually defining the usage of the tool. The item option(s) may also enable the instructor 142 to change a preset usage of the tool. In such a case, the preset usage of the tool may be used as a starting point from which the instructor 142 may determine the instruction to be provided to the user 132A.

In some embodiments, one or more of the preset options may be included within the instructor interface based on the location information further defining one or more characteristics of the target 160 at the location 110. For example, a particular tool available at the location 110 may include a set of preset uses. Certain preset uses may only be appropriate for particular types of targets. For instance, the particular tool may be a medical instrument and different preset options may be defined for the tool based on the age of the target. In some embodiments, the preset options may be automatically modified based on the characteristics of the target (e.g., as provided in the location information). For example, the location information may provide the severity of condition of the target 160 that must be addressed by the user 132A, and the preset options presented on the instructor interface may be changed based on the severity of the condition of the target 160.

In some embodiments, the item option(s) provided by the instructor interface may allow the instructor 142 to define a usage of an item with respect to the target 160 at the location 110 based on a three-dimensional model of the target 160. A three-dimensional model of the target 160 may include a mathematical representation of the shape and/or dimensions of the target 160. For instance, a three-dimensional model of the target 160 may provide for the size, shape, curvature, and/or other physical characteristics of the surface(s) of the target 160. A three-dimensional model of the target 160 may provide for how one part of the target 160 may move with respect to the location 110 and/or with other part(s) of the target 160. Defining a usage of an item with respect to the target 160 based on a three-dimensional model of the target 160 may provide for instructions that takes into account the shape and/or dimensions of the target 160.

In some embodiments, the instructor interface may include a segmentation option for presentation of the instruction to the user 132A by the user device 130A. The segmentation option may include one or more options to segment the presentation of the instruction by the user device 130A into multiple parts. For example, the instruction provided by the instructor 142 may span a certain amount of time (e.g., two minutes), and the segmentation option may include features that allow the instructor 142 to segment the length of the instruction into multiple parts (e.g., a beginning part that spans the first thirty seconds, a middle part for the following minute, a ending part that includes the last thirty seconds of the instruction). Such segmentation of instructions may enable the instructor 142 to separate a complex instruction into multiple parts for the user 132A. Presentation of different parts of the instruction by the user device 130A may be controlled through the user interface (the learner interface) of the user device 130A and/or the instructor interface. For example, the user 132A may interact with the learner interface of the user device 130A to determine when the user wishes to proceed from seeing a beginning part of the instruction to the next part of the instruction. As another example, presentation of different parts of the instructions may be controlled by the instructor 142 through the instructor interface of the instructor device 140. Retaining control over the presentation of different parts of the instruction may enable the instructor 142 to make sure that the user 132A is following each part of the instruction and not getting ahead/skipping steps.

The instructor device 140 may transmit instruction information to the server 120 (e.g., via the network(s) 150). The instruction information may define the instruction associated with the visual content. The instruction information may be transmitted to the server 120 for the server 120 to relay the instruction information to the user device 130A. The instruction information may be transmitted by the instructor device 140 to the server 120 automatically and/or based on instructor input. For instance, as the instructor 142 is providing input defining instruction to the instructor device 140, the instructor device 140 may transmit the instruction information to the server 120. As another example, the instructor device 140 may transmit the instruction information to the server 120 once the instructor 142 indicates (via the instructor interface) that the instruction should be sent.

The server 120 may receive the instruction information from the instructor device 140. Responsive to reception of the instruction information, the server may relay the received instruction information to one or both of the user devices 130A, 130B. The relay of the instruction information performed by the server 120 may include transmission of an exact copy of the instruction information received from the instructor device 140 to the user device(s) 130A, 130B, transmission of a modified version of the instruction information received from the instructor device 140 to the user device(s) 130A, 130B, and/or transmission of other information (e.g., information determined based on the received instruction information) to the user device(s) 130A, 130B.

One or both of the user devices 130A, 130B may receive at least a portion of the instruction information from the server 120. The received instruction information may be used to visually and/or verbally provide the instruction from the instructor 142 to the user(s) 132A, 132B. For example, the user device 130A may, based on the received instruction information, overlay the instruction on top of visual content (e.g., image(s), video(s)) captured by the user device 130A. The instruction may be presented on top of the visual content within the learner interface of the user device 130A. Overlaying of the instruction on top of the visual content may include placement of the instruction on a layer that is on top of the layer of the visual content and/or may include insertion of the instruction into the visual content. For instance, the instruction and the visual content may be separate visual elements which are presented together. The instruction and the visual content may form a single visual element (e.g., a single encoded stream of image(s)/video(s)) what is presented. Overlaying of the instruction on top of the visual content may provide an augmented reality view of the scene captured within the visual content. For example, a view of the target 160 may be augmented with instructions from the instructor 142. In some embodiments, the presentation of the instruction by the user device 130A may include a visual representation of a usage of an item (e.g., one of the items 170) with respect to the target 160 at the location 110. The visual representation of the usage of the item with respect to the target 160 may be scaled based on a size of the target. The visual representation of the usage of the item with respect to the target 160 may be presented based on a three-dimensional model of the target 160.

In some embodiments, the learner interface of the user device 130A may include one or more record options to record one or more portions of the instruction being presented on top of the visual content. For example, as the instruction from the instructor 142 is being presented on top of the visual content captured by the user device 130A, a record option may be presented on the learner interface of the user device 130A. The user 132A may interact with the record option to indicate to the user device 130A that the user 132A wishes to record one or more portions of the instruction presentation. Such recordation of the instruction may enable the user 132A to preserve one or more portions or the entirety of the instruction for replay. That is, after the instruction from the instruction 142 has been presented on the display of the user device 130A, the user 132A may replay the portion(s) the user 132A "recorded" on the user device 130A. In some embodiments, the user device 130A may automatically record the entire presentation of the instruction or one or more particular portions of the instruction presentation. For example, when the instruction is received and/or presented on the user device 130A, the user device may automatically start to record the presentation.

In some embodiments, the learner interface of the user device 130A may include one or more bookmark options to bookmark one or more portions of the instruction being presented on top of the visual content. For example, as the instruction from the instructor 142 is being presented on top of the visual content captured by the user device 130A, a bookmark option may be presented on the learner interface of the user device 130A. The user 132A may interact with the bookmark option to indicate to the user device 130A that the user 132A wishes to mark one or more portions of the instruction presentation. Such marking of the instruction may enable the user 132A to preserve the location of particular moments within the instruction presentation. That is, during replay of the instruction on the user device 130A, the user 132A may jump to a particular moment within the instruction presentation by using the bookmark marked at the moment. In some embodiments, one or more bookmarks may be created by the instructor 142 via the instructor interface.

In some embodiments, the learner interface may include one or more change options to change the instruction from the instructor 142. For example, as the instruction from the instructor 142 is being presented on top of the visual content captured by the user device 130A, a change option may be presented on the learner interface of the user device 130A. The user 132A may interact with the change option to indicate to the user device 130A that the user 132A wishes to change one or more portions of the instruction from the instructor 142. For example, the user 132A may wish to change the instruction based on the instruction not being clear and/or the user 132A not being able to perform the instruction. The server 120 may facilitate exchange of the change(s) to the instruction between the user device 130A and the instructor device 140 by relaying information relating to the changes between the user device 130A and the instructor device 140.

In some embodiments, the instruction from the instructor 142 may be overlaid on presentation of visual content within multiple user devices, such as the user device 130A and the user device 130B. The presentation of the instruction overlaid on top of the visual content may be the same or different for the user devices 130A, 130B. In some embodiments, the server 120 may transmit the same instruction information to both user devices 130A, 130B and the user devices 130A, 130B may display the same view of the instruction from the instructor 142. In some embodiments, the server 120 may transmit the same instruction information to both user devices 130A, 130B and the user devices 130A, 130B may display different views of the instruction from the instructor 142. In some embodiments, the server 120 may transmit the different instruction information to user devices 130A, 130B and the user devices 130A, 130B may display different views of the instruction from the instructor 142.

The user device 130B may provide a companion view of the instruction from the instructor 142. The instruction information transmitted by the server 120 to the user device 130B may be referred to as companion instruction. The companion instruction information may define the instruction from the instructor 142. The user device 130B may use the received companion instruction information to visually and/or verbally provide the instruction from the instructor 142. For example, the user device 130B may, based on the received companion instruction information, overlay the instruction on top of visual content (e.g., image(s), video(s)) within a user interface of the user device 130B. The visual content may be captured by the user device 130A and/or the user device 130B. That is, the user device 130B may present the instruction overlaid on top of image(s)/video(s) captured by the user device 130A and/or may present the instruction overlaid on top of image(s)/video(s) captured by the user device 130B. In some embodiments, the companion instruction information may define the visual content captured by the user device 130A. Such presentation of a companion view may enable the user 132B to watch over the execution of the instruction by the user 132A and/or to ensure that the instruction is followed by the user 132A.

In some embodiments, the companion view presented by the user device 130B may show a different perspective of the target 160 and/or the instruction than the view of the instruction/the target 160 presented by the user device 130A. For example, a companion view presented by the user device 130B may include presentation of different perspective of a usage of an item with respect to the target 160 than presented on the user device 130A. For example, the usage of the item with respect to the target 160 may be presented on the user device 130A based on visual content of the target 160 captured from the left side of the target 160. The usage of the item with respect to the target 160 may be presented on the user device 130B based on visual content of the target 160 captured from the right side of the target 160. That is, the different perspectives of the usage of the item with respect to the target 160 and/or other views of the instruction may be presented based on the orientations of the user devices 130A, 130B with respect to the target 160 at the location 110.

FIGS. 2, 3, 4, 5A, 5B, 6, 7, and 8 illustrate example user interfaces 200, 300, 400, 500, 550, 600, 700, 800 in accordance with one or more embodiments of the technology disclosed herein. In various embodiments, the user interfaces 200, 300, 400, 500, 550, 600, 700, 800 may be accessed through a software application running on a computing device (e.g., computers, mobile phones, tablets, etc.) that includes one or more processors and memory. Depending on the computing device, a user may be able to interact with the user interfaces 200, 300, 400, 500, 550, 600, 700, 800 using various input devices (e.g., keyboard, mouse, etc.) and/or touch gestures. The user interfaces 200, 300, 400, 500, 550, 600, 700, 800 are provided merely as examples and, naturally, the arrangement and configuration of such user interfaces can vary depending on the implementation. Thus, depending on the implementation, the user interfaces 200, 300, 400, 500, 550, 600, 700, 800 may include additional features and/or alternative features. The user interfaces 200, 300, 400, 500, 550, 600, 700, 800 may include/enable one or more functionalities of the interface(s) described with respect to the user devices 130A, 130B, the instructor device 140, and/or other components of the environment 100 described with respect with FIG. 1.

Figure 2:
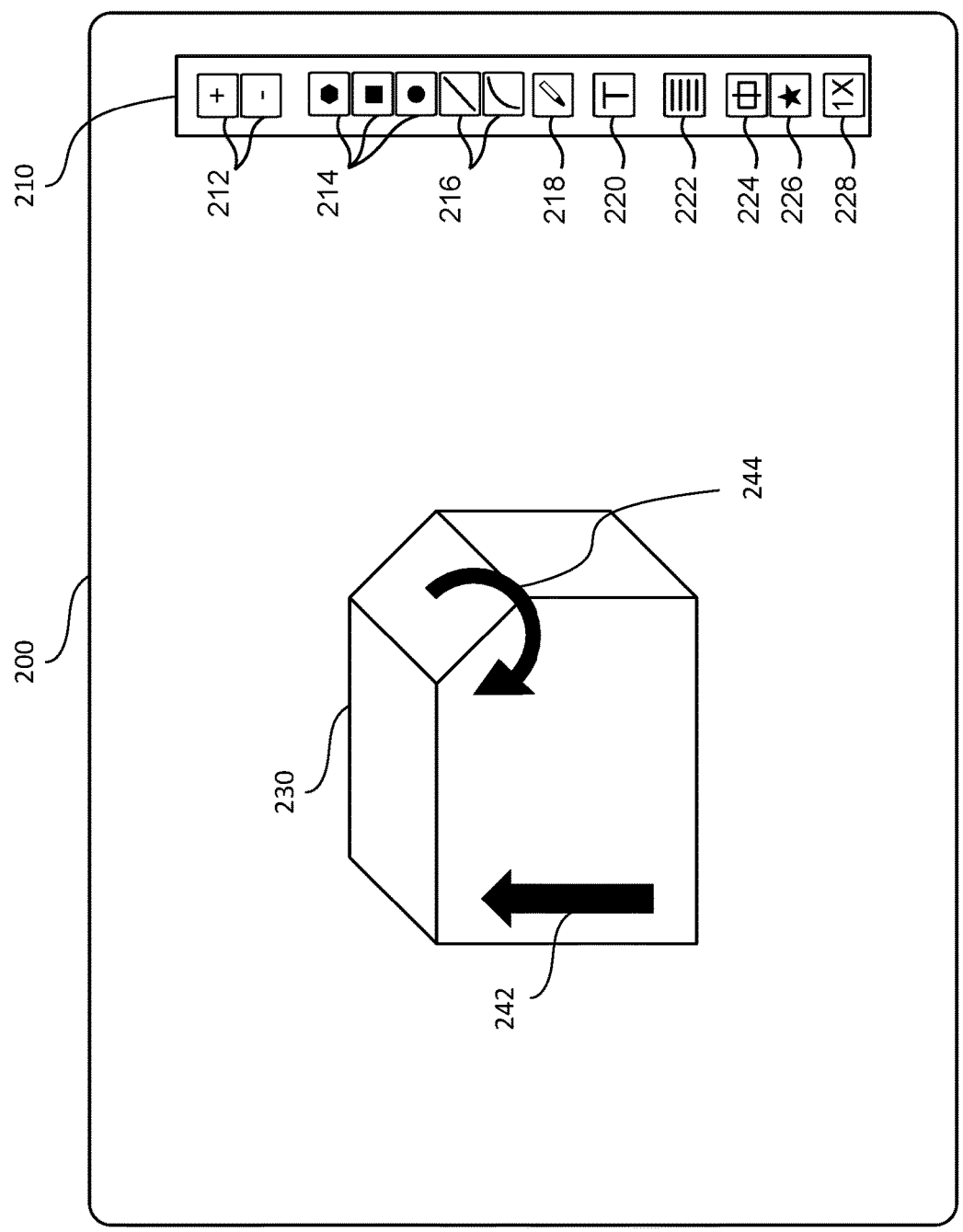
FIG. 2 illustrates an example user interface in accordance with one or more embodiments of the technology disclosed herein.

FIG. 2 illustrates an example instructor interface 200 in accordance with one or more embodiments of the technology disclosed herein. The instructor interface 200 may be presented on and/or by an instructor device, such as the instructor device 140. Visual content (e.g., image(s), video(s)) may be presented within the instructor interface 200. For example, as shown in FIG. 2, the instructor interface 200 may include presentation of an image/video of a target 230. The target 230 may be located remotely from the instructor device presenting the instructor interface 200. The visual content presented within the instructor interface 200 may be captured by a user device at the location of the target 230. Information defining the visual content may be relayed to the instructor device over a network/server.

An instructor may interact with the instructor interface 200 to provide instruction(s) to a person at the location of the target 230. For example, the instructor may interact with the instructor interface 200 to provide instruction(s) to the user of the user device that capture image(s)/video(s) of the target 230. For instance, the instructor may move one or more icons on the instructor interface 200, such as icons representing items available for use at the location of the target 230, to show how the items are to be used with respect to the target 230. The instructor may interact with the instructor interface 200 to provide instruction(s) that do not require the use of item(s). For example, the instructor may use one or more icons on the instructor interface 200 to provide instruction on how to interact with the target 230, such as directions 242, 244. The direction 242 may include an arrow that indicates that the user is to push up on the left side of the target 230. The direction 244 may include an arrow that indicates that the user is to move a component from the top right side of the target 230 to the front of the target 230. Other provision of instructions are contemplated.

As another example, the instructor may use one or more icons on the instructor interface 200 to provide instruction on how to perform CPR to a person. The instruction provided by using the instructor interface 200 may include static objects or dynamic objects. For example, an instruction on how to perform CPR may include static images representing hands of the person performing CPR that are placed on a particular location of the person receiving CPR (target). As another example, an instruction on how to perform CPR may include dynamic images representing hands of the person performing CPR that are placed on a particular location of the target. The images representing the hands may change (e.g., change in size, change in color, change in brightness) to indicate when the person performing CPR is to press down, to indicate the pressure to be applied, and/or to otherwise convey certain aspects of CPR instruction. In some embodiments, one or more portions of the instructions may be provided visually, verbally (e.g., user device outputting sounds/commands), and/or haptically.

The instructor interface 200 may include one or more options 210 for use by the instructor. For example, the options 210 may include zoom options 212, shape options 214, line options 216, a free draw option 218, a text insertion option 220, a drawer option 222, a segment option 224, a bookmark option 226, a speed option 228, and/or other options. The zoom options 212 may enable the instructor to change the viewing zoom with which the visual content is displayed within the instructor interface 212. The instructor may use the zoom options 212 to focus in/out on the relevant parts of the target 230 and/or the environment of the target 230. For example, based on the visual content including a visual representation of the entire target 230 and the instruction to be provided being applicable to a small portion of the target 230, the instructor may use the zoom options 212 to zoom in on the relevant portion and provide detailed instructions for the portion.

The shape options 214 may enable the instructor to insert one or more shapes as part of the instruction. The line options 216 may enable the instructor to insert one or more lines as part of the instruction. The free draw option 218 may enable the instructor to freely draw within the instructor interface 200 to provide the instruction. The text insertion option 220 may enable the instructor to insert text to provide the instruction. The drawer option 222 may enable the instructor to see a list of items that are available to be used at the location of the target 230. The instructor may select one or more icons representing items from the list and move the icons within the instructor interface 200 to specify how the item(s) are to be used with respect to the target. The instructor may use one or more of the options 214, 216, 218, 220, 222 to define the instruction to be overlaid on top of the visual content.

The segment option 224 may enable the instructor to segment the presentation of the instruction by a user device into multiple parts. For example, the instructor may have define the direction 242 as the first part of the instruction. Before defining the direction 244 as the second part of the instruction, the instructor may use the segment option 224 to separate the second part of the instruction from the first part of the instruction. As another example, the instructor may, by interacting with the instructor interface 200, define an instructor that spans a certain amount of time. The instructor may use the segment option 224 while going over the instruction (e.g., replaying the instruction, moving over different portions of the instruction using a seekbar) to segment the instructions by time. The bookmark option 226 may enable the instructor to mark one or more particular moments within the instructions. Such marks may be used by the instructor and/or the user to jump to the particular moments within the instructions.

The speed option 228 may enable the instructor to change the playback speed of the instruction. For example, the instruction defined by the instructor using the instructor interface 200 may be presented on a user device at the same speed with which the instructor defined the instruction. For instance, the instructor may have defined the direction 242 by drawing the arrow over two seconds. The direction 242 may be presented on the user device as being drawn over two seconds. The instructor may use the speed option 228 to change the playback speed of one or more portions of the instruction. For example, the playback speed of the direction 242 may be increased so that it is shown on the user device more rapidly than it was defined within the instruction interface 200, while the playback speed of the direction 244 may be decreased so that it is shown on the user device more slowly than it was defined within the instruction interface 200.

Figure 3:
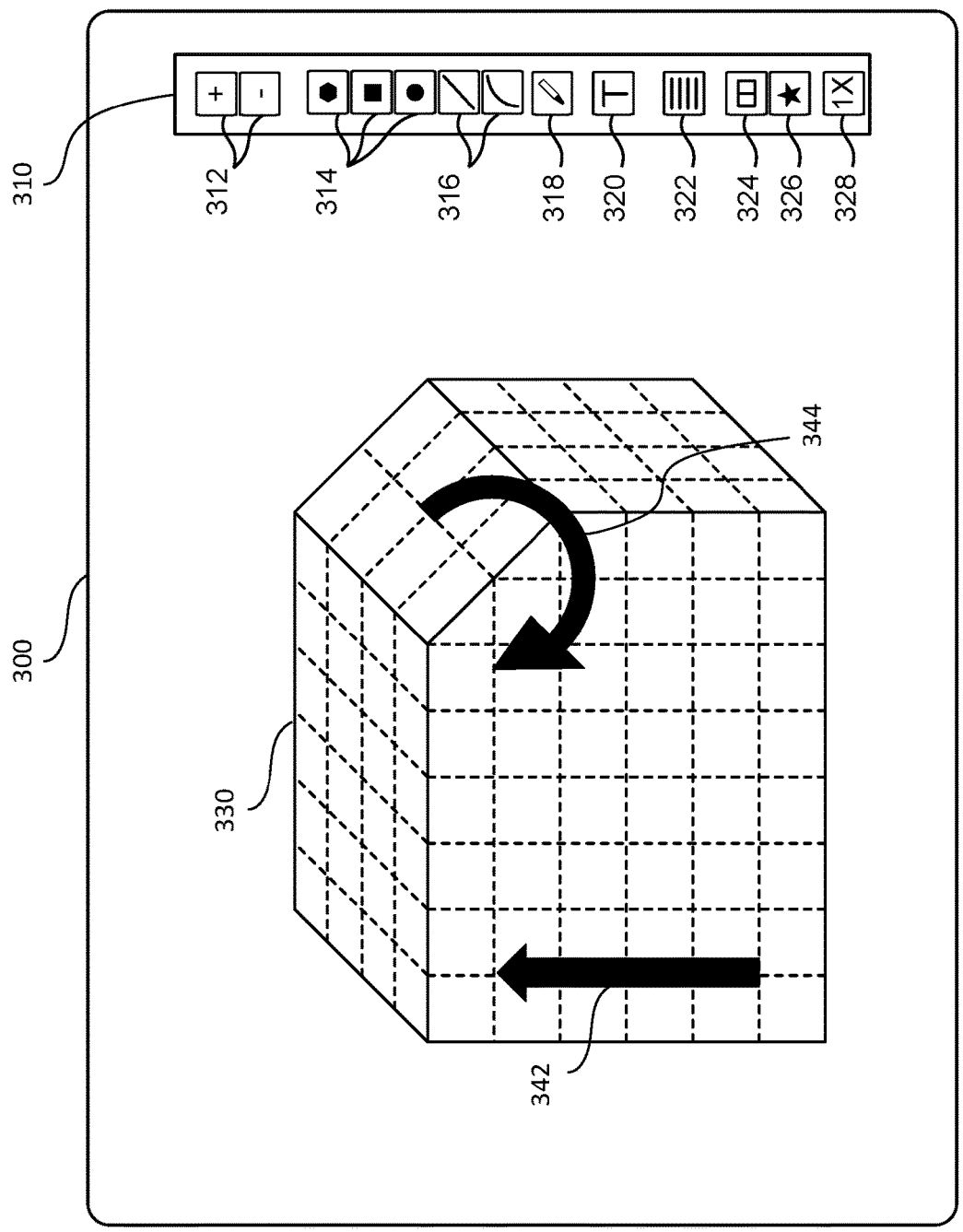
FIG. 3 illustrates an example user interface in accordance with one or more embodiments of the technology disclosed herein.

FIG. 3 illustrates an example instructor interface 300 in accordance with one or more embodiments of the technology disclosed herein. The instructor interface 300 may be presented on and/or by an instructor device, such as the instructor device 140. Visual content may be presented within the instructor interface 300. For example, as shown in FIG. 3, the instructor interface 300 may include presentation of an image/video of a target 330. The target 330 may be located remotely from the instructor device presenting the instructor interface 300. The visual content presented within the instructor interface 300 may be captured by a user device at the location of the target 330. Information defining the visual content may be relayed to the instructor device over a network/server.

The instructor interface 300 may include one or more options 310 for use by the instructor. For example, the options 310 may include zoom options 312, shape options 314, line options 316, a free draw option 318, a text insertion option 320, a drawer option 322, a segment option 324, a bookmark option 326, a speed option 328, and/or other options. The options 310 may work as the options 210 described with respect to the instructor interface 200. An instructor may interact with the instructor interface 300 to provide instruction(s) to a person at the location of the target 330. For example, the instructor may interact with the instructor interface 300 to provide instruction(s) to the user of the user device that capture image(s)/video(s) of the target 330. For example, the instructor may use one or more icons on the instructor interface 300 to provide instruction on how to interact with the target 330, such as directions 342, 344. The direction 342 may include an arrow that indicates that the user is to push up on the left side of the target 330. The direction 344 may include an arrow that indicates that the user is to move a component from the top right surface of the target 330 to the front surface of the target 230. Other provision of instructions are contemplated.

The instructor interface 300 may allow the instructor to define instruction, such as a usage of an item, with respect to the target 330 based on a three-dimensional model of the target 330. The three-dimensional model of the target 330 may provide for the size, shape, curvature, and/or other physical characteristics of the surface(s) of the target 330. The three-dimensional model of the target 330 may provide for how one part of the target 330 may move with respect to the location of the target 330 and/or with other part(s) of the target 330. Defining instructions with respect to the target 330 based on a three-dimensional model of the target 330 may provide for instructions that takes into account the shape and/or dimensions of the target 330. For instance, the direction 344 may be defined with respect to the three-dimensional model of the target 330 such that the beginning of the direction 344 is pinned to the center of the top-right surface of the target 330 and the ending of the direction 344 is pinned to the top right corner of the front surface of the target 330. The three-dimensional relationship between the target 330 and the direction 344 may be preserved when the view of the target 330 changes. For example, the user device capturing the visual content of the target 330 may change to capture a different perspective of the target 330, and the direction 344 may move/change shape with the change in perspective to preserve the three-dimensional relationship between the target 330 and the direction 344.

Figure 4:
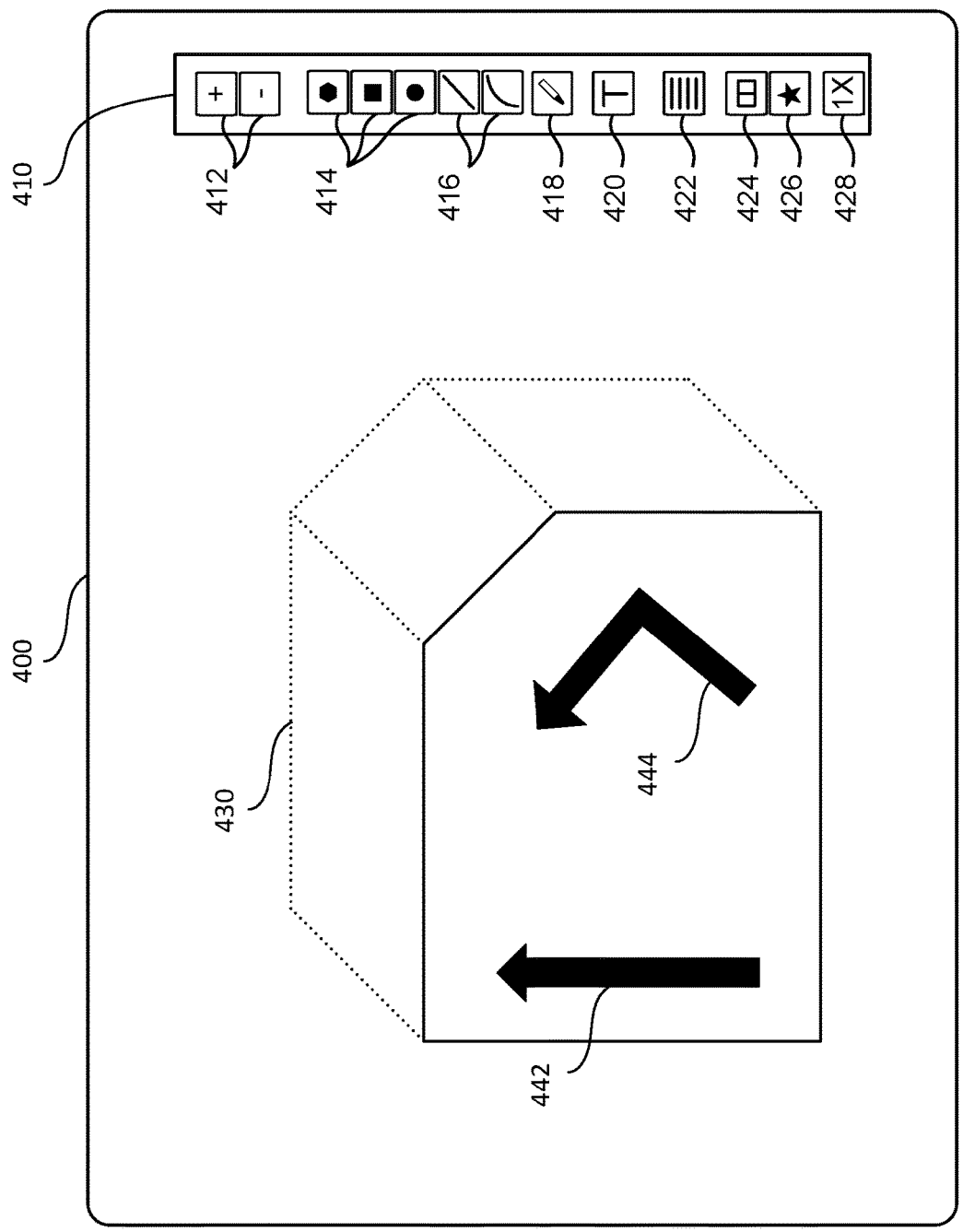
FIG. 4 illustrates an example user interface in accordance with one or more embodiments of the technology disclosed herein

FIG. 4 illustrates an example instructor interface 400 in accordance with one or more embodiments of the technology disclosed herein. The instructor interface 400 may be presented on and/or by an instructor device, such as the instructor device 140. Visual content may be presented within the instructor interface 400. For example, as shown in FIG. 4, the instructor interface 400 may include presentation of an image/video of a target 430. The target 430 may be located remotely from the instructor device presenting the instructor interface 400. The visual content presented within the instructor interface 400 may be captured by a user device at the location of the target 430. Information defining the visual content may be relayed to the instructor device over a network/server.

The instructor interface 400 may include one or more options 410 for use by the instructor. For example, the options 410 may include zoom options 412, shape options 414, line options 416, a free draw option 418, a text insertion option 420, a drawer option 422, a segment option 424, a bookmark option 426, a speed option 428, and/or other options. The options 410 may work as the options 210 described with respect to the instructor interface 200. An instructor may interact with the instructor interface 400 to provide instruction(s) to a person at the location of the target 430. For example, the instructor may interact with the instructor interface 400 to provide instruction(s) to the user of the user device that capture image(s)/video(s) of the target 430. For example, the instructor may use one or more icons on the instructor interface 400 to provide instruction on how to interact with the target 430, such as directions 442, 444.

The instructor's use of the instructor interface 400 may change one or more visual aspects of the visual content. For example, based on the instructions defined by the instructors (e.g., the directions 442, 444) being focused on the front surface of the target 430, the front surface of the target 430 may be emphasized over others portions of the target 430 within the instructor interface 400. The front surface of the target 430 may be emphasized over others portions of the target 430 within the learner interface presenting the directions 442, 444. For instance, the front surface of the target 430 may be presented in color while other portions of the target may be presented in gray scale. The front surface of the target 430 may be shown in focus while other portions of the target may be blurred. Other emphasis of the relevant portions of the target 430 are contemplated. In some embodiments, the emphasis of the different portions of the target 430 may be performed using a three-dimensional model of the target 430. For example, the three-dimensional model of the target 430 may be used to identify the portion(s) (e.g., surface(s)) of the target 430 at which instruction is directed and to emphasize the corresponding portion of the image/video. In some embodiments, the options 410 may include an emphasis option that enables the instructor to define which portions of the target 430 are emphasized/deemphasized.

Figure 5A:
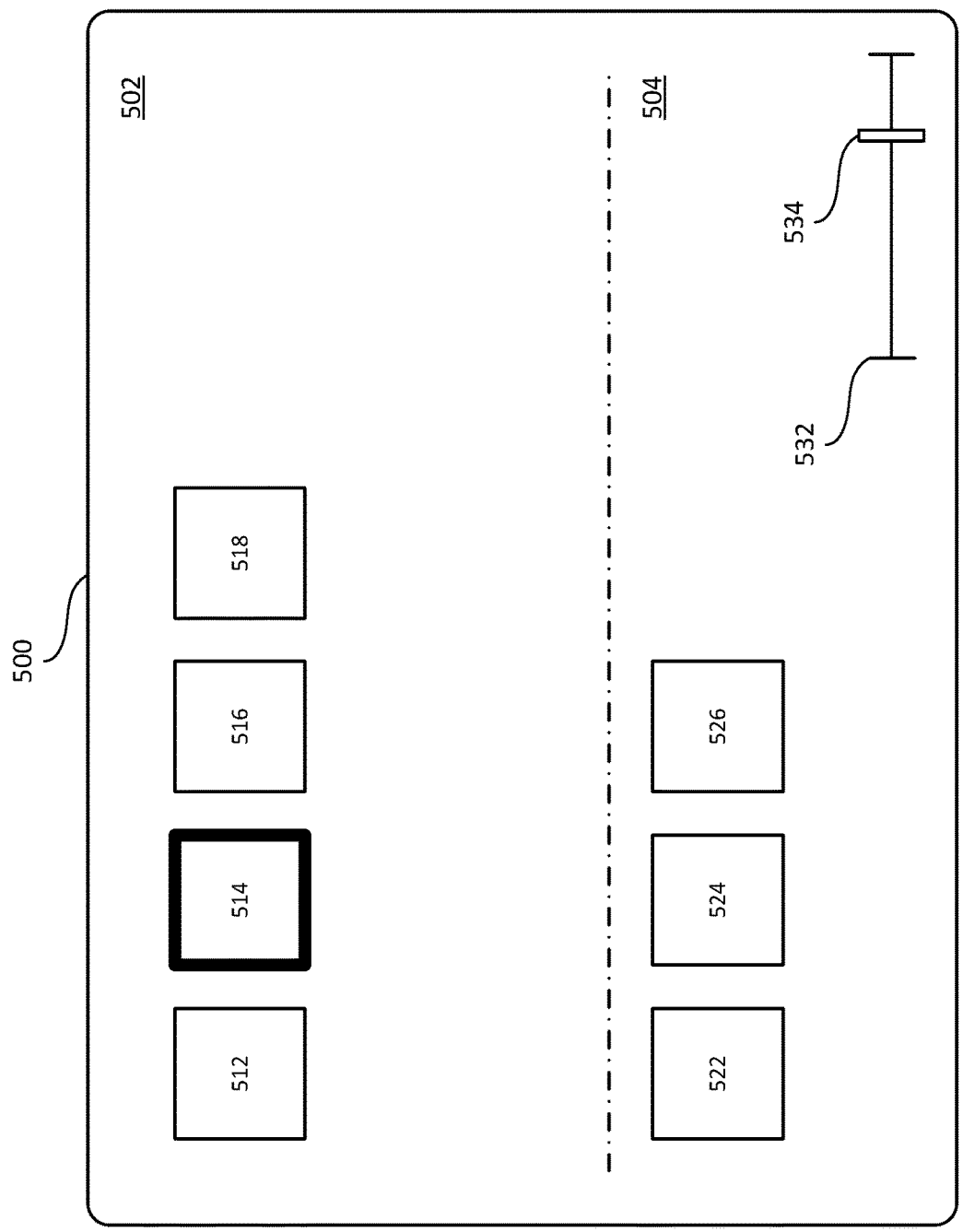
FIG. 5A illustrates an example user interface in accordance with one or more embodiments of the technology disclosed herein.

FIG. 5A illustrates an example user interface 500 in accordance with one or more embodiments of the technology disclosed herein. The user interface 500 may be presented on and/or by an instructor device, such as the instructor device 140, and/or a user device, such as the user device 130A or the user device 130B. The user interface 500 may be presented within another interface, such as the instructor interfaces 200, 300, 400 and/or a learner interface. For example, the user interface 500 may be presented in response to a user or an instructor interacting with an option, such as a drawer option. The user interface may provide a list of items that are available to be used at a particular location. An instructor may select one or more icons representing the items from the list and move the icon(s) within the instructor interface to specify how the item(s) are to be used with respect to a target. A user may select one or more icons representing the items from the list to see instructions (e.g., basic instructions) for using the item(s).

For example, the user interface 500 may include a portion 502 and a portion 504. The portion 502 may include icons 512, 514, 516, 518 representing different items that are available to be used at a location. An instructor and/or a user may select an icon, such as the icon 514, to see additional information relating to the corresponding item. For example, responsive to selection of the icon 514 in the portion 502, additional information about the corresponding item may be displayed in the portion 504. For instance, responsive to selection of the icon 514, options 522, 524, 526, and 532 may be presented in the portion 504. The options 522, 524, 526 may enable a user or an instructor to see different information relating to the item corresponding to the icon 514, such as one or more preset usages of the item and/or instructions on how to use the item. The option 532 may include a slider 534, which may be moved to change the scaling of the item with respect to a target. For example, the slider 534 may be moved to one side to decrease the size of the item with respect to a target and may be moved to the other side to increase the size of the item with respect to the target.

Figure 5B:
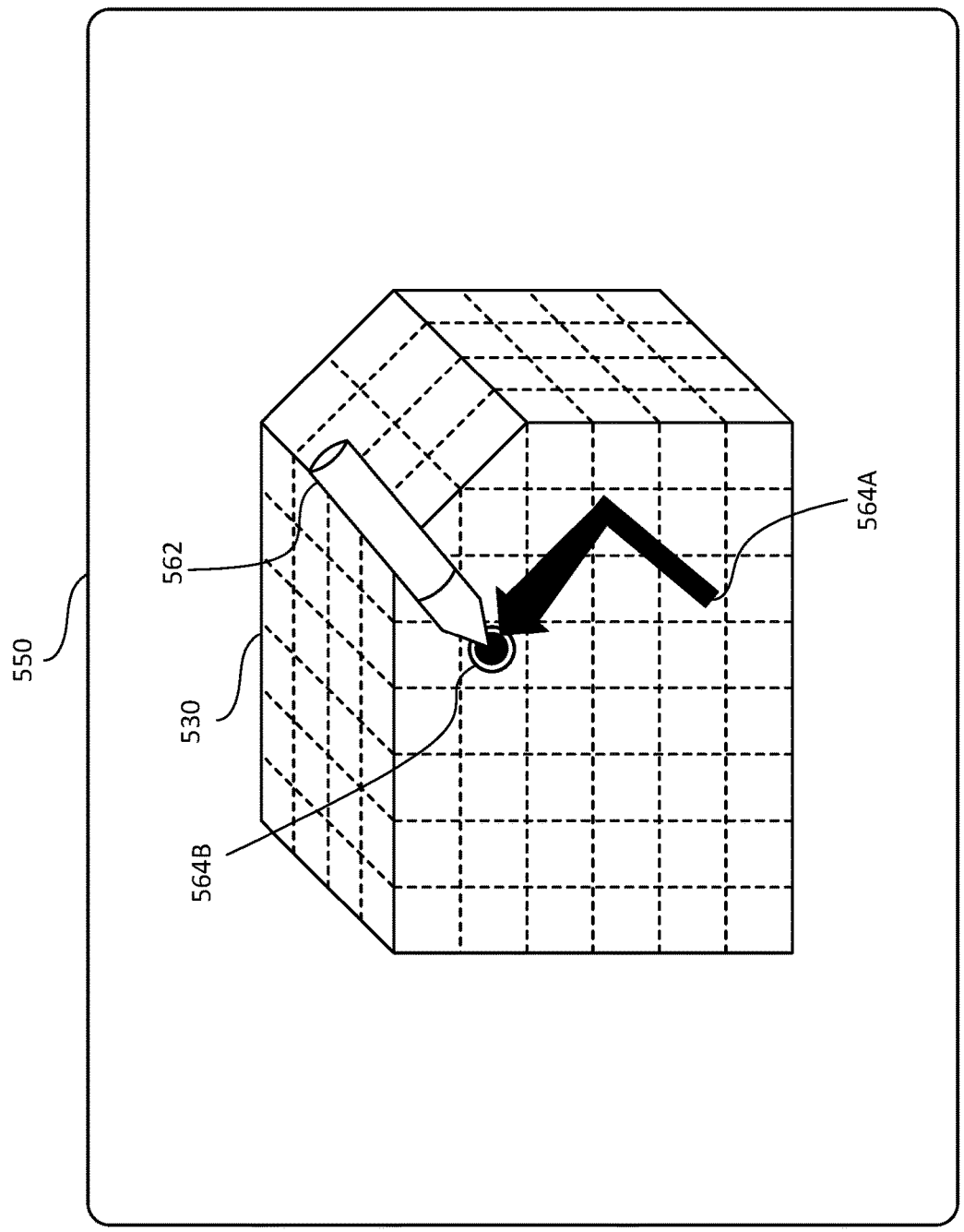
FIG. 5B illustrates an example user interface in accordance with one or more embodiments of the technology disclosed herein.

FIG. 5B illustrates an example user interface 550 in accordance with one or more embodiments of the technology disclosed herein. The user interface 550 may be presented on and/or by an instructor device, such as the instructor device 140, and/or a user device, such as the user device 130A or the user device 130B. The interface 550 may present an instruction for using an item 562 with respect to a target 530. The item 562 may have been selected from a list of item available to be used at the location of the target 530, such as from the interface 500. The item 562 may be moved within the instruction interface to define one or more instructions on the use of the item 562 with respect to the target 530. For example, an instructor may define the directions 564A, 564B for the item 562 using the instructor interface, and the directions 564A, 564B may be overlaid on top of an image/video of the target 530 within a learner interface. The visual characteristics of the directions 564A, 564 may be used to convey different instructions. For instance, the color, shape, and/or the size of the direction 564A may be changed to indicate the pressure and/or the speed with which the item 562 is to be moved across the front surface of the target 530. As another example, the color, shape, and/or the size of the direction 564B may be changed to indicate the pressure, the length of time, and/or the depth with which the item 452 is to be pushed on/into the front surface of the target 530. For instance, the instruction may include information indicating that the item 562 is to be contacted with the front surface of the target 530. The direction 564B may pulse and/or change color to indicate to a user when the item 562 is to be contacted with the front surface of the target 530. Other changes in visual characteristics of instructions and other types of instructions are contemplated.

Figure 6:
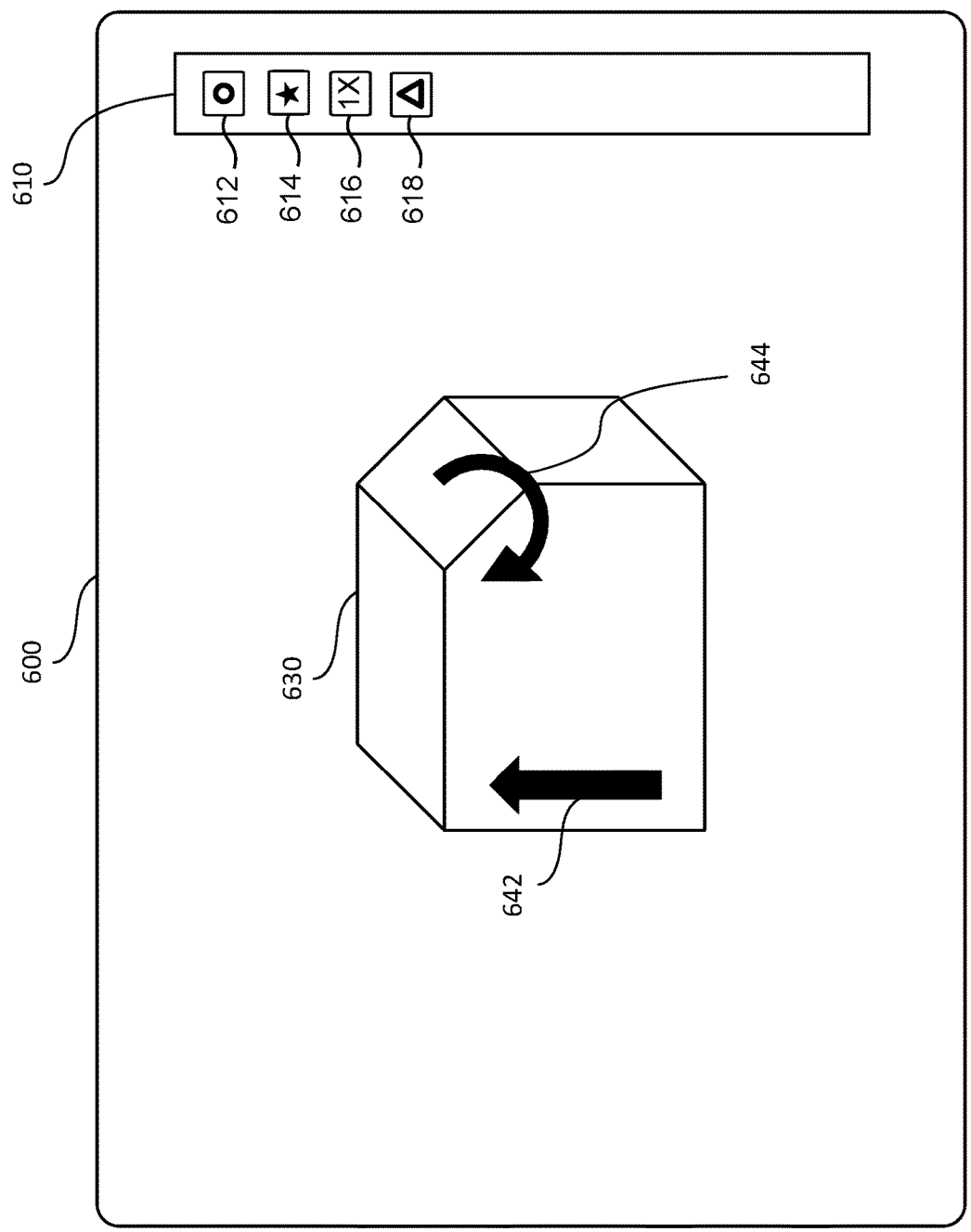
FIG. 6 illustrates an example user interface in accordance with one or more embodiments of the technology disclosed herein.

FIG. 6 illustrates an example learner interface 600 in accordance with one or more embodiments of the technology disclosed herein. The learner interface 600 may be presented on and/or by a user device, such as the user device 130A. Visual content may be presented within the learner interface 600. For example, as shown in FIG. 6, the learner interface 600 may include presentation of an image/video of a target 630. The target 630 may be located at the location of the user and the user device. The visual content presented within the learner interface 600 may be captured by the user device at the location of the target 630. Information defining instructions associated with the visual content may be relayed (e.g., over a network/server) to the user device from an instructor device. For example, the instruction associated with the visual content may include directions 642, 644. The directions may be overlaid on top of the visual content and may provide instructions on how to interact with the target 630.

The learner interface 600 may include one or more options 610 for use by the user. For example, the options 610 may include a record option 612, a bookmark option 614, a speed option 616, a change option 618, and/or other options. The record option 612 may enable a user to record one or more portions of the instruction presented within the learner interface 600. For example, the user may toggle the record option 612 to turn on/off the recording of instructions presented on the learner interface 600. In some embodiments, the "recording" of instructions may include marking of one or more portions of the instructions. For example, the user may interact with the record option 612 to mark certain portions of the instruction presentation for replay and/or review. The bookmark option 614 may enable the user to mark one or more particular moments within the instructions. Such marks may be used by the user and/or the instructor to jump to the particular moments within the instructions. The speed option 616 may enable the user to change the playback speed of the instruction. For example, the user may user the speed option 616 to increase and/or decrease the speed with which the instruction is presented within the learner interface 600.

The change option 618 may enable the user to change one or more portions of the instruction. For example, the user may insert text into the instruction being presented within the learner interface 600 to ask the instructor one or more questions. As another example, the user may change the shape, size, direction, and/or other aspects of the directions 642, 644. The information describing the changes made by the user may be transmitted to the instructor device.

Figure 7:
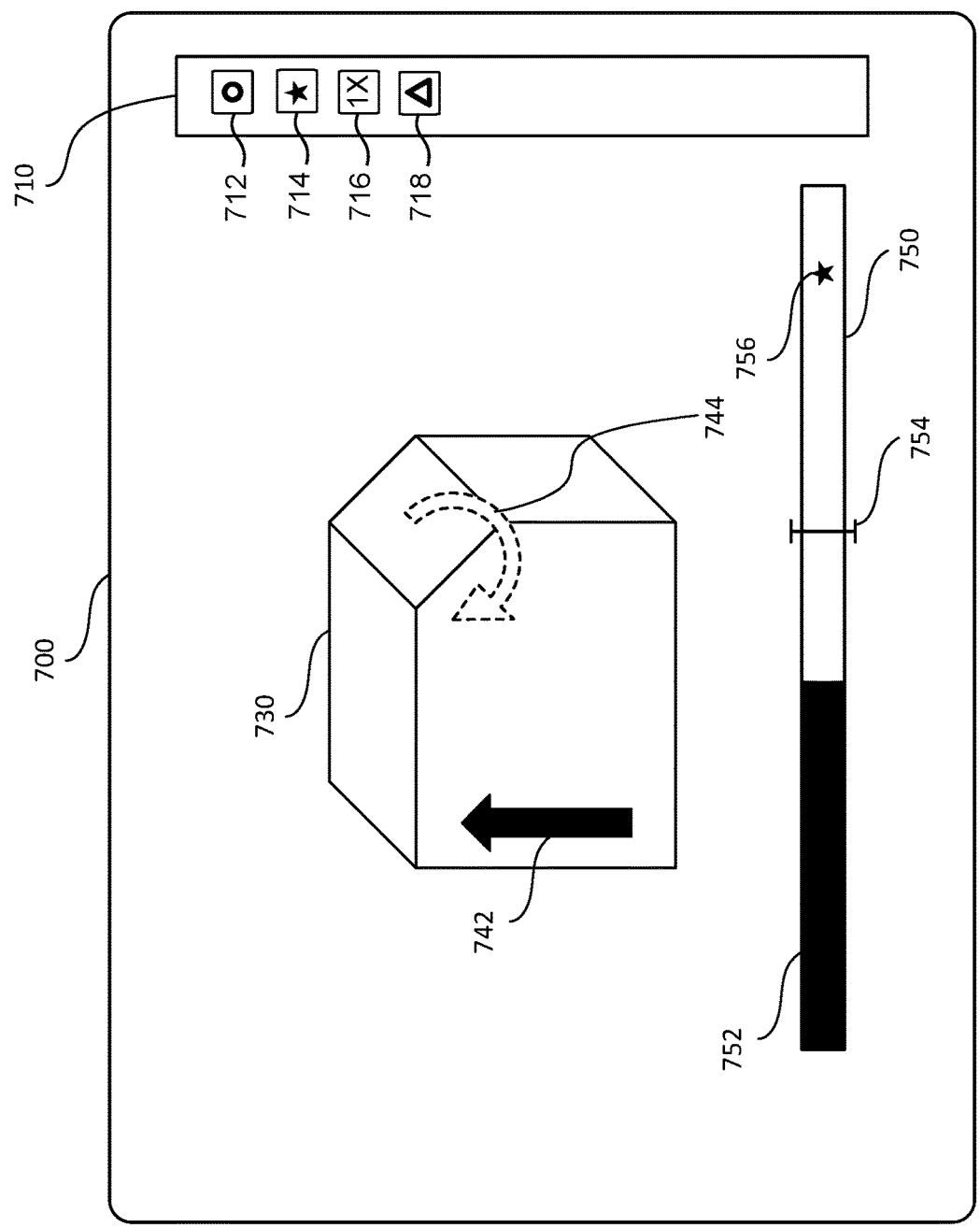
FIG. 7 illustrates an example user interface in accordance with one or more embodiments of the technology disclosed herein.

FIG. 7 illustrates an example learner interface 700 in accordance with one or more embodiments of the technology disclosed herein. The learner interface 700 may be presented on and/or by a user device, such as the user device 130A. Visual content may be presented within the learner interface 700. For example, as shown in FIG. 7, the learner interface 700 may include presentation of an image/video of a target 730. The target 730 may be located at the location of the user and the user device. The visual content presented within the learner interface 700 may be captured by the user device at the location of the target 730. Information defining instructions associated with the visual content may be relayed (e.g., over a network/server) to the user device from an instructor device. For example, the instruction associated with the visual content may include directions 742, 744. The directions may be overlaid on top of the visual content and may provide instructions on how to interact with the target 730.

The learner interface 700 may include one or more options 710 for use by the user. For example, the options 710 may include a record option 712, a bookmark option 714, a speed option 716, a change option 718, and/or other options. The options 710 may work as the options 610 described with respect to the instructor interface 600. The instruction provided by the instructor may be segmented into multiple parts. For example, a progress bar 750 may be displayed on the learner interface 700. The progress bar may indicate the length of the instruction and what moment/duration of the instruction is being presented within the learner interface 700. For instance, as shown in FIG. 7, a black portion 752 may indicate the portion of the instruction that has been presented. The presentation of the black portion 752 of the instruction may include the direction 742 and may not include the direction 744. The direction 744 may not be displayed and/or may be displayed different until the corresponding portion of the instruction is reached. For example, the direction 744 may be displayed in outline until the corresponding portion of the instruction is reached, at which point the direction 744 may be displayed in full. The instruction may be segmented into two parts by a divider 754. In some embodiments, presentation of different parts of the instruction within the learner interface 700 may be controlled by the instructor (e.g., through the instructor interface). For example, the user may only be shown the second part of the instruction when the instructor gives access to the second part of the instruction and/or when the instructor prompts the second part of the instruction to be presented within the learner interface 700. The instruction may also be bookmarked, such as shown by a bookmark 756. The user and/or the instructor may use the bookmark 756 to jump to a moment in the second part of the instruction.

Figure 8:
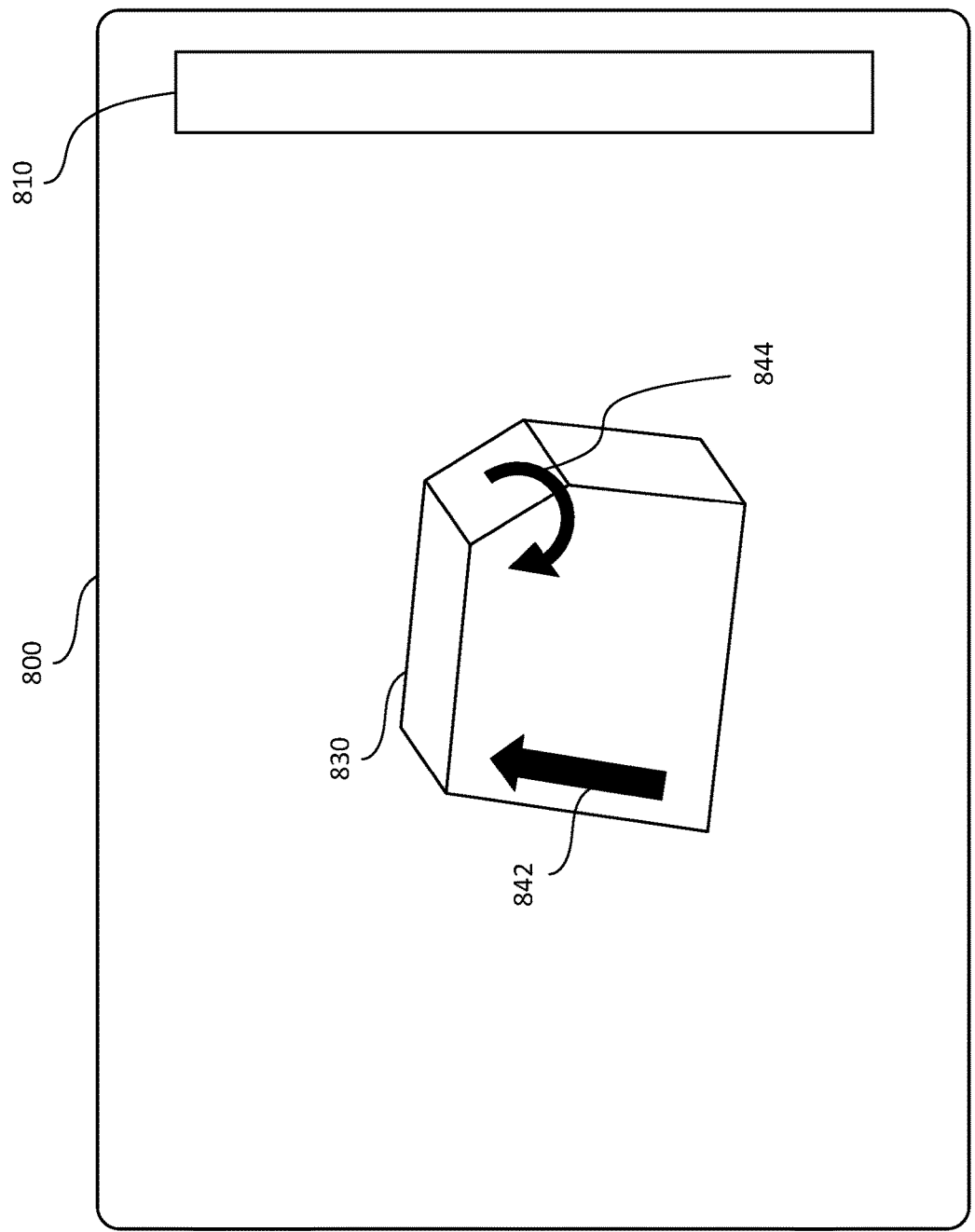
FIG. 8 illustrates an example user interface in accordance with one or more embodiments of the technology disclosed herein.

FIG. 8 illustrates an example learner interface 800 in accordance with one or more embodiments of the technology disclosed herein. The learner interface 800 may be presented on and/or by a user device, such as the user device 130B. Visual content may be presented within the learner interface BOO. For example, as shown in FIG. 8, the learner interface 800 may include presentation of an image/video of a target 830. The target 830 may be located at the location of the user and the user device. The visual content presented within the learner interface 800 may be captured by the user device at the location of the target 830. Information defining instructions associated with the visual content may be relayed (e.g., over a network/server) to the user device from an instructor device. For example, the instruction associated with the visual content may include directions 842, 844. The directions may be overlaid on top of the visual content and may provide instructions on how to interact with the target 830. The learner interface 800 may include one or more options 810 for use by the user. For example, the learner interface 800 may include one or more options described with respect to the options 610, and/or other options.

The learner interface 800 may provide a different view of the instruction from an instructor based on changes in orientation of the user device with respect to the target. For example, the user device may be, based on an original position of the user device with respect to the target, be presenting a view of the target as shown in FIG. 6. Based on changes in the position of the user device and/or the target, the view of the target as shown in FIG. 8 may be displayed. The instructions may be changed to account for the change in perspective of the target shown within the learner interface 800.

The learner interface 800 may provide a companion view of the instruction from an instructor. For example, there may be two user devices at the location of the target 830. One user device may be positioned to see a view of the target as shown in FIG. 6. The other user device may be positioned to see a view of the target as shown in FIG. 8. Thus, the two user devices may see different versions/perspectives of the instruction based on the orientations of the user devices with respect to the target.

Figure 9:
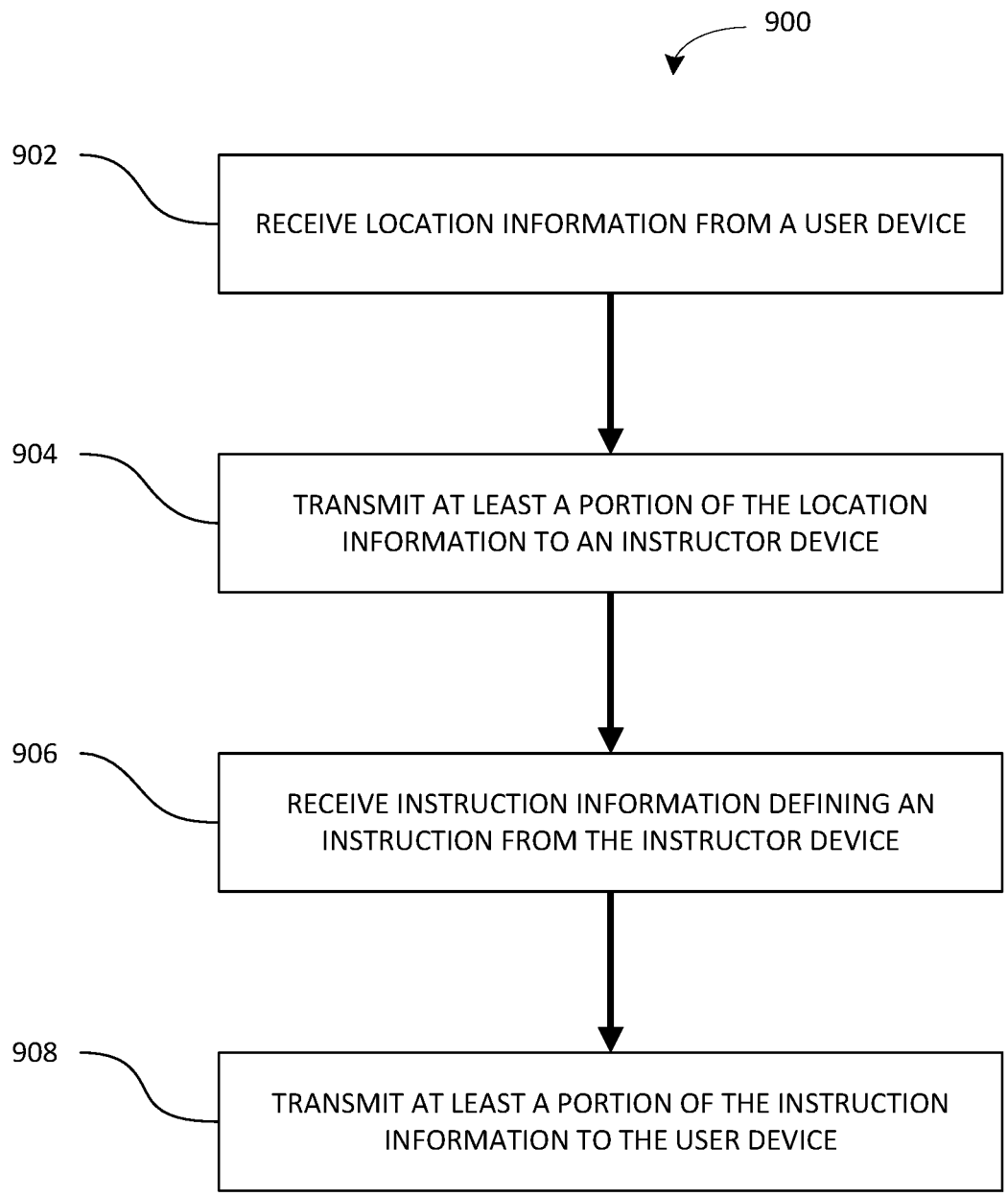
FIG. 9 illustrates an example method in accordance with one or more embodiments of the technology disclosed herein.

FIG. 9 illustrates an example method 900 that may be implemented in accordance with one or more embodiments of the technology disclosed herein. The steps of the method 900 may be implemented in/through one or more computing devices, such as the server 120 (as shown in FIG. 1 and described herein). At step 902, location information may be received from a user device. At step 904, at least a portion of the location information may be transmitted to an instructor device. At step 906, instruction information defining an instruction may be received from the instructor device. At step 908, at least a portion of the instruction information may be transmitted to the user device.

Figure 10:
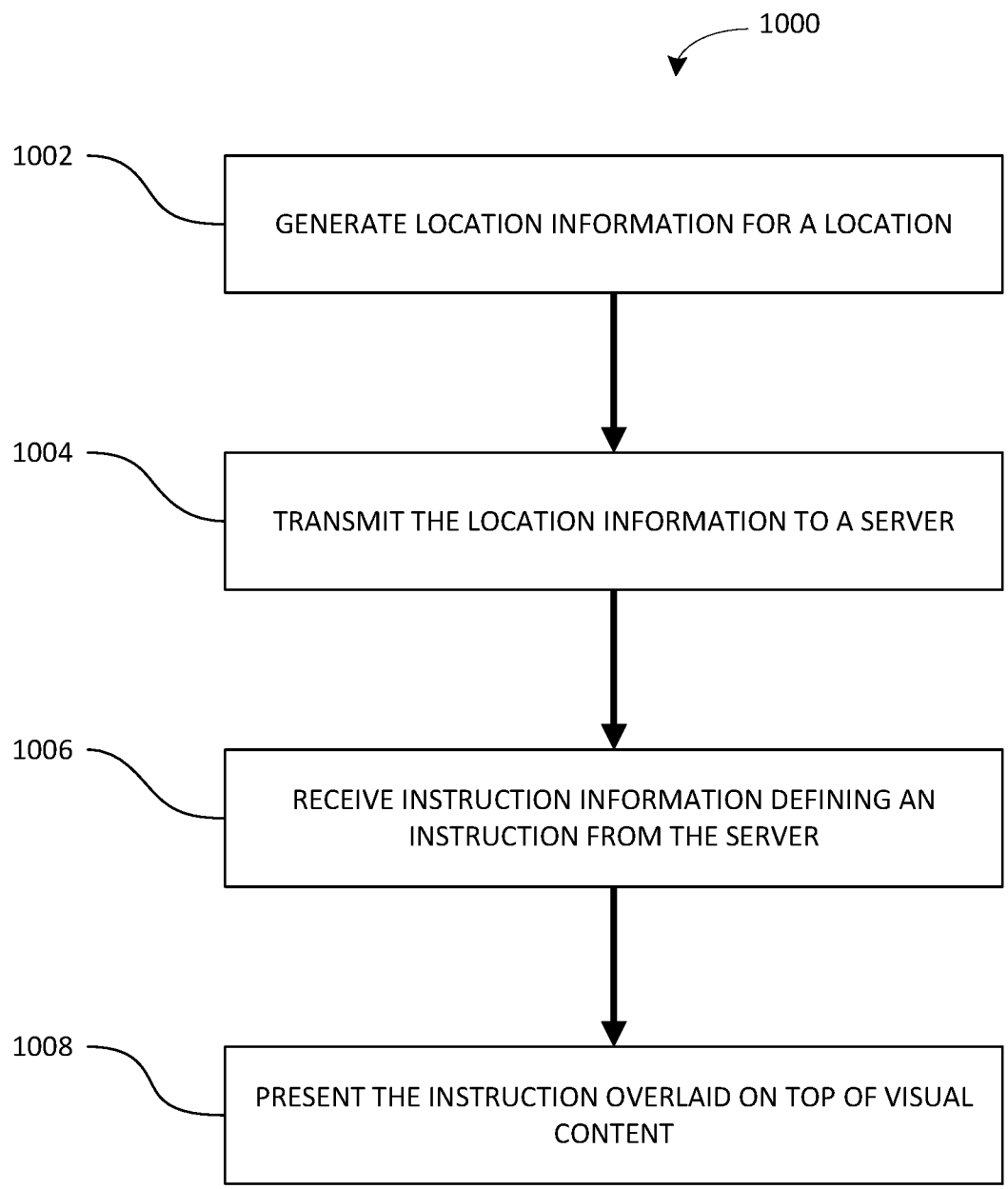
FIG. 10 illustrates an example method in accordance with one or more embodiments of the technology disclosed herein.

FIG. 10 illustrates an example method that may be implemented in accordance with one or more embodiments of the technology disclosed herein. The steps of the method 1000 may be implemented in/through one or more computing devices, such as the user device 130A and/or the user device 130B (as shown in FIG. 1 and described herein). At step 1002, location information for a location may be generated. At step 1004, at least a portion of the location information may be transmitted to a server. At step 1006, instruction information defining an instruction may be received from the server. At step 1008, the instruction may be presented overlaid on top of visual content.

Figure 11:
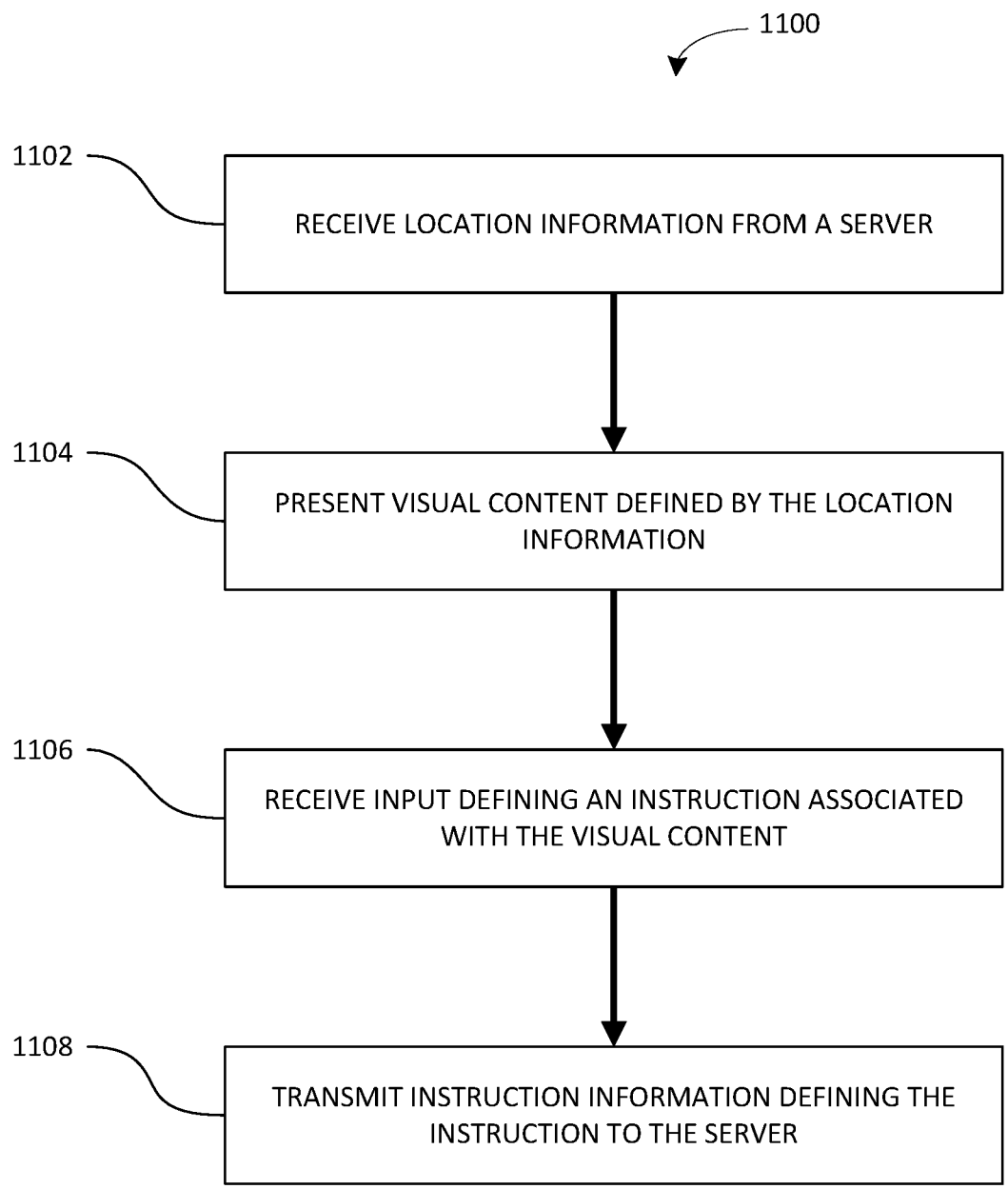
FIG. 11 illustrates an example method in accordance with one or more embodiments of the technology disclosed herein.

FIG. 11 illustrates an example method that may be implemented in accordance with one or more embodiments of the technology disclosed herein. The steps of the method 1100 may be implemented in/through one or more computing devices, such as the instructor device 140 (as shown in FIG. 1 and described herein). At step 1102, location information may be received from a server. At step 1104, visual content defined by the location information may be presented. At step 1106, input defining an instruction associated with the visual content may be received. At step 1108, the instruction information defining the instruction may be transmitted to the server.

Figure 12:
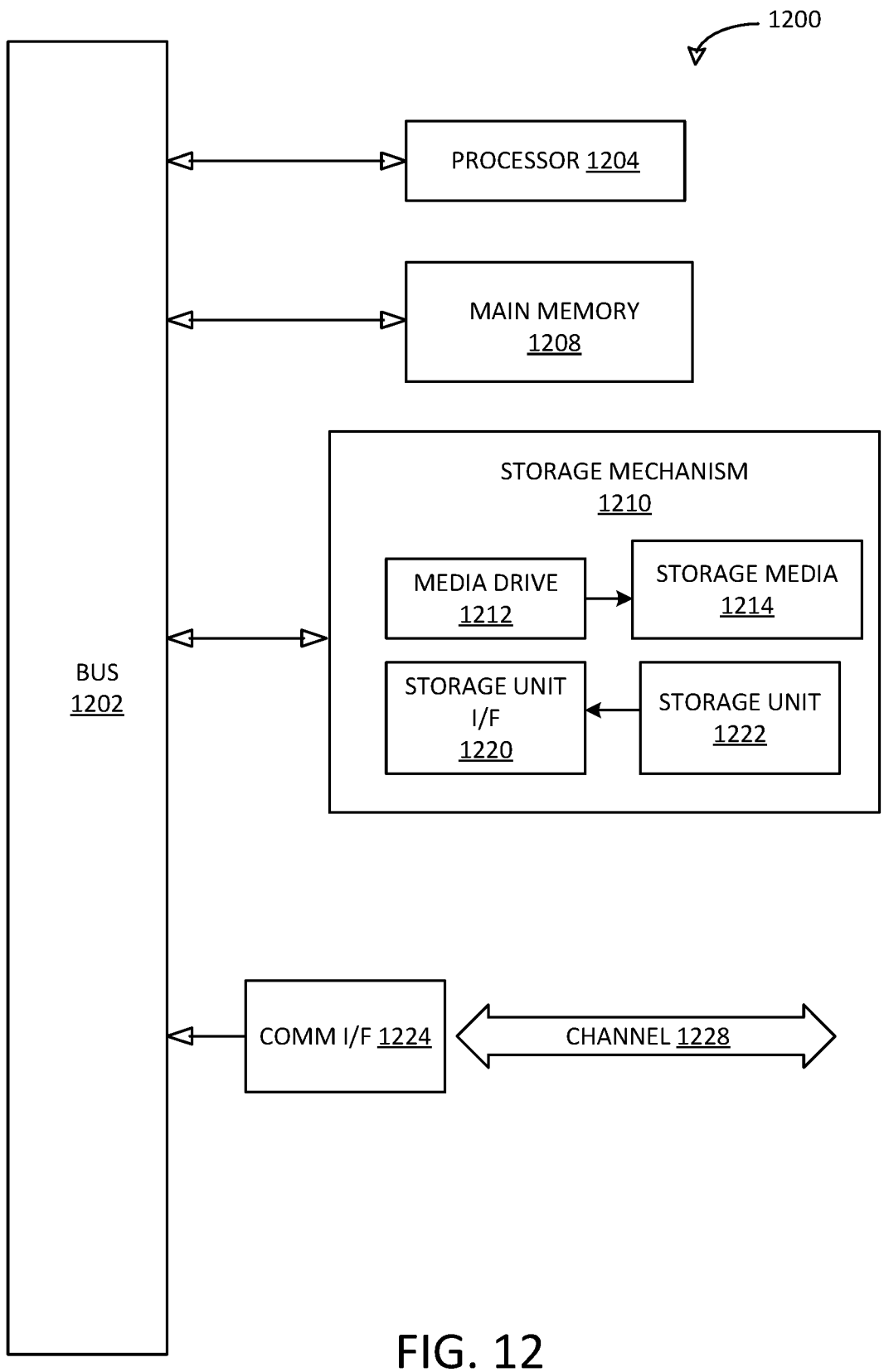
FIG. 12 illustrates an example computing circuit that may be used in implementing various features of embodiments of the technology disclosed herein.

As used herein, the term circuit/logic might describe a given unit of functionality that can be performed in accordance with one or more embodiments of the technology disclosed herein. As used herein, a circuit/logic might be implemented utilizing any form of hardware, software, firmware, or a combination thereof. For example, one or more processors, controllers, ASICs, PLAs, PALs, CPLDs, FPGAs, logical components, software routines or other mechanisms might be implemented to make up a circuit/logic. In implementation, the various circuits/logics described herein might be implemented as discrete circuits/logics or the functions and features described can be shared in part or in total among one or more circuits/logics. In other words, as would be apparent to one of ordinary skill in the art after reading this description, the various features and functionality described herein may be implemented in any given application and can be implemented in one or more separate or shared circuits/logics in various combinations and permutations. Even though various features or elements of functionality may be individually described or claimed as separate circuits/logics, one of ordinary skill in the art will understand that these features and functionality can be shared among one or more common software and hardware elements, and such description shall not require or imply that separate hardware or software components are used to implement such features or functionality.

Where components or circuits/logics of the technology are implemented in whole or in part using software, in one embodiment, these software elements can be implemented to operate with a computing or processing circuit/logic capable of carrying out the functionality described with respect thereto. One such example computing circuit/logic is shown in FIG. 12. Various embodiments are described in terms of this example-computing circuit 1200. After reading this description, it will become apparent to a person skilled in the relevant art how to implement the technology using other computing circuits/logics or architectures.

Referring now to FIG. 12, computing circuit 1200 may represent, for example, computing or processing capabilities found within desktop, laptop and notebook computers; hand-held/wearable computing devices (PDA's, smart phones, smart glasses, cell phones, palmtops, etc.); mainframes, supercomputers, workstations or servers; or any other type of special-purpose or general-purpose computing devices as may be desirable or appropriate for a given application or environment. Computing circuit 1200 might also represent computing capabilities embedded within or otherwise available to a given device. For example, a computing circuit might be found in other electronic devices such as, for example, digital cameras, navigation systems, cellular telephones, portable computing devices, modems, routers, WAPs, terminals and other electronic devices that might include some form of processing capability.

Computing circuit 1200 might include, for example, one or more processors, controllers, control circuits, or other processing devices, such as a processor 1204. Processor 1204 might be implemented using a general-purpose or special-purpose processing engine such as, for example, a microprocessor, controller, or other control logic. In the illustrated example, processor 1204 is connected to a bus 1202, although any communication medium can be used to facilitate interaction with other components of computing circuit 1200 or to communicate externally.

Computing circuit 1200 might also include one or more memory components, simply referred to herein as main memory 1208. For example, preferably random access memory (RAM) or other dynamic memory, might be used for storing information and instructions to be executed by processor 1204. Main memory 1208 might also be used for storing temporary variables or other intermediate information during execution of instructions to be executed by processor 1204. Computing circuit 1200 might likewise include a read only memory ("ROM") or other static storage device coupled to bus 1202 for storing static information and instructions for processor 1204.

The computing circuit 1200 might also include one or more various forms of information storage mechanism 1210, which might include, for example, a media drive 1212 and a storage unit interface 1220. The media drive 1212 might include a drive or other mechanism to support fixed or removable storage media 1214. For example, a hard disk drive, a floppy disk drive, a magnetic tape drive, an optical disk drive, a CD or DVD drive (R or RW), or other removable or fixed media drive might be provided. Accordingly, storage media 1214 might include, for example, a hard disk, a floppy disk, magnetic tape, cartridge, optical disk, a CD or DVD, or other fixed or removable medium that is read by, written to or accessed by media drive 1212. As these examples illustrate, the storage media 1214 can include a computer usable storage medium having stored therein computer software or data. For example, one or more memory components may include non-transitory computer readable medium including instructions that, when executed by the processor 1204, cause the computing circuit 1200 to perform one or more functionalities described herein.

In alternative embodiments, information storage mechanism 1210 might include other similar instrumentalities for allowing computer programs or other instructions or data to be loaded into computing circuit 1200. Such instrumentalities might include, for example, a fixed or removable storage unit 1222 and an interface 1220. Examples of such storage units 1222 and interfaces 1220 can include a program cartridge and cartridge interface, a removable memory (for example, a flash memory or other removable memory component) and memory slot, a PCMCIA slot and card, and other fixed or removable storage units 1222 and interfaces 1220 that allow software and data to be transferred from the storage unit 1222 to computing circuit 1200.

Computing circuit 1200 might also include a communications interface 1224. Communications interface 1224 might be used to allow software and data to be transferred between computing circuit 1200 and external devices. Examples of communications interface 1224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1224 might typically be carried on signals, which can be electronic, electromagnetic (which includes optical) or other signals capable of being exchanged by a given communications interface 1224. These signals might be provided to communications interface 1224 via a channel 1228. This channel 1228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1208, storage unit 1220, media 1214, and channel 1228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing circuit 1200 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent circuit names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "circuit" does not imply that the components or functionality described or claimed as part of the circuit are all configured in a common package. Indeed, any or all of the various components of a circuit, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for remotely communicating instructions, the system comprising:

a server communicatively coupled to a first user device and an instructor device, the server, the first user device, and the instructor device individually comprising a memory and a processor, the server configured to:
receive location information from the first user device, the location information characterizing a location of the first user device, wherein the location information defines visual content captured by the first user device;
transmit at least a portion of the location information to the instructor device, the instructor device configured to present the visual content within an instructor interface based on the received location information and receive input from an instructor through the instructor interface, the input defining an instruction associated with the visual content;
receive instruction information defining the instruction associated with the visual content from the instructor device; and
transmit at least a portion of the instruction information to the first user device, the first user device configured to present the instruction overlaid on top of the visual content within a first learner interface based on the received instruction information;
wherein the instruction information comprises a direction, the direction defining how to use an item to perform the instruction, and wherein one or more of a size, a shape, and a color associated with the direction indicates one or more of a pressure to apply, a speed with which to move the item, a depth with which the item is to be pushed on or into a surface of the target, a time to contact the item to the surface of the target, and period of time to use the item.

2. The system of claim 1, wherein the first learner interface includes a record option to record one or more portions of the instruction being presented on top of the visual content.

3. The system of claim 1, wherein the first learner interface includes a bookmark option to bookmark one or more portions of the instruction being presented on top of the visual content.

4. The system of claim 1, wherein the instructor interface includes a segmentation option to segment the presentation of the instruction by the first user device into multiple parts.

5. The system of claim 4, wherein presentation of different parts of the instruction by the first user device is controlled through the first learner interface or the instructor interface.

6. The system of claim 1, wherein the first learner interface includes a change option to change the instruction and the server is further configured to facilitate exchange of the change to the instruction between the first user device and the instructor device.

7. The system of claim 1, wherein the presentation of the instruction by the first user device includes a visual representation of a usage of an item with respect to a target at the location.

8. The system of claim 7, wherein the visual representation of the usage of the item with respect to the target at the location is scaled based on a size of the target.

9. The system of claim 7, wherein the instructor interface includes an item option to allow the instructor to interact with a visual representation of the item to define the instruction on the usage of the item with respect to the target at the location.

10. The system of claim 9, wherein the visual representation of the item is presented in the instructor interface based on a determination that the item is available for use at the location.

11. The system of claim 9, wherein the item option includes a set of preset options defining preset usage of the item with respect to the target at the location.

12. The system of claim 11, wherein at least some of the set of preset options are included within the instructor interface based on the location information further defining one or more characteristics of the target at the location.

13. The system of claim 9, wherein the item option allows the instructor to define the usage of the item with respect to the target at the location based on a three-dimensional model of the target.

14. The system of claim 7, wherein the visual representation of the usage of the item with respect to the target at the location is presented based on a three-dimensional model of the target.

15. The system of claim 14, wherein the three-dimensional model of the target is generated based on a three-dimensional mapping of the target by the first user device, wherein the location information further defines the three-dimensional mapping of the target.

16. The system of claim 14, wherein:
the server further communicatively couples to a second user device;
the server is further configured to transmit companion instruction information to the second user device, the companion instruction information defining the instruction; and
the second user device is configured to present the visual representation of the usage of the item with respect to the target at the location within a second learner interface based on the received companion instruction information.

17. The system of claim 16, wherein the presentation the visual representation of the usage of the item with respect to the target at the location by the first user device and the second user device include different perspectives of the usage of the item with respect to the target at the location based on orientations of the first user device and the second user device with respect to the target at the location.

18. The system of claim 1, wherein the visual content includes one or more images or one or more videos of the location.

19. A method for remotely communicating instructions, the method performed by a server communicatively coupled to a first user device and an instructor device, the server, the first user device, and the instructor device individually comprising a memory and a processor, the method comprising:
receiving location information from the first user device, the location information characterizing a location of the first user device, wherein the location information defines visual content captured by the first user device;
transmitting at least a portion of the location information to the instructor device, the instructor device configured to present the visual content within an instructor interface based on the received location information and receive input from an instructor through the instructor interface, the input defining an instruction associated with the visual content;
receiving instruction information defining the instruction associated with the visual content from the instructor device; and
transmitting at least a portion of the instruction information to the first user device, the first user device configured to present the instruction overlaid on top of the visual content within a first learner interface based on the received instruction information;
wherein the instruction information comprises a direction, the direction defining how to use an item to perform the instruction, and wherein one or more of a size, a shape, and a color associated with the direction indicates one or more of a pressure to apply, a speed with which to move the item, a depth with which the item is to be pushed on or into a surface of the target, a time to contact the item to the surface of the target, and period of time to use the item.

20. A non-transitory computer readable medium comprising instructions that, when executed, cause a server communicatively coupled to a first user device and an instructor device to perform:
receiving location information from the first user device, the location information characterizing a location of the first user device, wherein the location information defines visual content captured by the first user device;
transmitting at least a portion of the location information to the instructor device, the instructor device configured to present the visual content within an instructor interface based on the received location information and receive input from an instructor through the instructor interface, the input defining an instruction associated with the visual content;
receiving instruction information defining the instruction associated with the visual content from the instructor device; and
transmitting at least a portion of the instruction information to the first user device, the first user device configured to present the instruction overlaid on top of the visual content within a first learner interface based on the received instruction information;
wherein the instruction information comprises a direction, the direction defining how to use an item to perform the instruction, and wherein one or more of a size, a shape, and a color associated with the direction indicates one or more of a pressure to apply, a speed with which to move the item, a depth with which the item is to be pushed on or into a surface of the target, a time to contact the item to the surface of the target, and period of time to use the item.

\* \* \* \* \*